(12) United States Patent
Brannen

(10) Patent No.: US 11,557,990 B2
(45) Date of Patent: Jan. 17, 2023

(54) POSITION CORRECTED COMMUTATION OF BRUSHLESS DIRECT CURRENT MOTORS

(71) Applicant: Agave Semiconductor, LLC, Phoenix, AZ (US)

(72) Inventor: Robert Alan Brannen, Phoenix, AZ (US)

(73) Assignee: Agave Semiconductor, LLC, Phoenix, AZ (US)

( * ) Notice: Subject to any disclaimer, the term of this patent is extended or adjusted under 35 U.S.C. 154(b) by 125 days.

(21) Appl. No.: 16/709,814

(22) Filed: Dec. 10, 2019

(65) Prior Publication Data
US 2020/0186060 A1    Jun. 11, 2020

Related U.S. Application Data

(60) Provisional application No. 62/830,222, filed on Apr. 5, 2019, provisional application No. 62/777,618, filed on Dec. 10, 2018.

(51) Int. Cl.
*H02P 6/15*       (2016.01)
*H02P 6/28*       (2016.01)

(52) U.S. Cl.
CPC .............. *H02P 6/153* (2016.02); *H02P 6/28* (2016.02)

(58) Field of Classification Search
CPC ................................ H02P 6/153; H02P 6/28
See application file for complete search history.

(56) References Cited

U.S. PATENT DOCUMENTS

| | | | | |
|---|---|---|---|---|
| 2003/0193306 A1* | 10/2003 | Griffitts | ..................... | H02P 6/18 318/459 |
| 2004/0164733 A1* | 8/2004 | Fukaya | ................... | G01D 5/145 324/207.2 |
| 2007/0159124 A1* | 7/2007 | Wasson | ..................... | H02P 6/15 318/400.06 |
| 2015/0229248 A1* | 8/2015 | Richards | ................ | H02K 21/12 318/400.04 |

\* cited by examiner

*Primary Examiner* — Muhammad S Islam
*Assistant Examiner* — Bradley R Brown
(74) *Attorney, Agent, or Firm* — McCoy Russell LLP

(57) ABSTRACT

Examples of methods and systems for compensating for the timing delay caused by the winding impedance of the motor coils and/or for non-ideal rotor magnet shapes and positions are disclosed. The example methods and systems may include generating a synthesized commutation signal compensating for non-ideal magnet shapes and positions (e.g., asymmetrical magnet positions) on a rotor and/or compensates for the timing delay caused by the winding impedance of the motor coils.

19 Claims, 15 Drawing Sheets

POSITION CORRECTED COMMUTATION OF BRUSHLESS DIRECT CURRENT MOTORS

CROSS REFERENCE TO RELATED APPLICATIONS

This application claims priority to U.S. Provisional Application No. 62/777,618, entitled "POSITION CORRECTED COMMUTATION OF PULSE WIDTH MODULATED BRUSHLESS DIRECT CURRENT MOTORS," filed Dec. 10, 2018. This application also claims priority to U.S. Provisional Application No. 62/830,222, entitled "POSITION CORRECTED COMMUTATION OF BRUSHLESS DIRECT CURRENT MOTORS," filed Apr. 5, 2019. The entire contents of each of the above applications is hereby incorporated by reference in their entirety for all purposes.

FIELD

This description is directed to motor controllers for brushless direct current motors. In particular, systems and methods for adjusting the commutation timing to account for the random manufacturing variations of the permanent magnets and their placement in the motor, and/or to account for the timing delay caused by the winding impedance of the motor coils are provided.

BACKGROUND AND SUMMARY

Torque and motion in direct current (DC) motors are a result of the attraction and repulsion between the permanent magnetic poles on a rotor and electro-magnetic poles of a stator. The torque is a function of the magnetic field strength between the rotor and stator poles, as well as the geometry of the motor, and the relative angular positioning of the rotor and stator. The orientation and polarity of the magnets on the rotor relative to stator coils controls, along with the desired direction of rotation, determines the required polarity of the stator poles. Motor movement is thus controlled by the stator coils, which when energized by current flow in one direction, and then by reversing the direction to the other, creates an alternating magnetic field that propels the rotor. As the rotor turns, the required polarity of the electro-magnets of the stator constantly changes from north to south and back again to allow the rotor to continue spinning in the same direction. In some motor winding configurations where multiple pole pairs are used in the stator, the stator pole polarity may have three settings: North, South, and Off (no stator winding current). The principle of motion based on magnetic attraction and repulsion is the same for all brushless DC motors regardless of the number of permanent magnets and electromagnets used, and regardless of the motor winding configuration. The example in the description herein is for a single-phase motor winding configuration with two permanent magnet pole pairs and two electromagnet pole pairs, but the concept also applies to multiple phase motor winding configurations and any number of stator and rotor pole pairs.

The changing of the electro-magnet polarity is known as commutation. In brushed DC motors this is done mechanically with a split ring commutator. In brushless DC (BLDC) motors, the current and thus the magnetic pole orientation is reversed using electronic switches. In order to avoid shorting out the supplies during commutation, there is a short commutation dead time between when the winding current flowing in one direction is turned off and the time before current is turned on in the other direction. This dead time is accomplished electronically in BLDC motors in contrast to a mechanically created gap in the split ring commutator of brushed motors.

In many DC motor applications it is desirable to reduce torque variation throughout each rotation of the motor, and to increase (e.g., optimize) the torque for any given amount of power delivered to the motor. To this end, many variations on how the stator coil windings are energized between commutation events have been proposed. These include variations on pulse width modulation (PWM) and pulse amplitude modulation speed control techniques.

Effective (e.g., optimal) commutation is also beneficial to the overall performance of the motor. The timing of the commutation event is as beneficial as the method used to energize the stator coils in between commutation events. Effective (e.g., optimal) commutation timing involves accurately sensing the angular position of the rotor magnets relative to the stator coils. In brushless DC motors, the position of the rotor magnets relative to the stator is typically sensed using a magnetic Hall effect sensor that is attached to the stator. Other sensor types may also be used to sense the magnetic field and position of the permanent magnets. In this example, a Hall effect sensor is used, but the methodology described herein is independent of the sensor type used. As the rotor magnets pass by the Hall effect sensor, the output of the Hall effect sensor outputs a signal indicating the polarity (north or south) of the closest rotor magnet. The Hall amplifier is a circuit that converts the Hall effect sensor signal to a logical 1 or 0, depending on polarity of the closest magnet to the sensor. The magnetic polarity information is used in deciding when to reverse the current direction through the stator windings. Other methods used to detect the rotor position include optical sensors, as well as "sensorless" techniques which monitor flux linkage or the back electromotive force (EMF) induced by the rotor's movement onto a stator winding.

All of these various rotor position-sensing techniques may work as long as the rotor is perfectly manufactured with the ideal geometry and there is no timing delay introduced by the winding impedance of the motor coils.

If the rotor and stator are perfectly manufactured to the ideal geometry, the magnetic attraction and repulsion of all the rotor and stator poles can work together to simultaneously promote rotation in the same direction. However, common manufacturing defects and/or tolerances may yield asymmetrical, or misshaped rotor magnets, or non-ideal placement of the rotor magnets. For example magnets with varying sizes and/or magnets mounted at asymmetrical positions on the rotor. As a result of the varying rotor geometry, the position of magnetic boundaries/edges on the rotor may vary as much as 10-15 degrees. This results in misalignment between the rotor magnets and the stator coils during some angular positions of one rotation of the motor. Whereas all combinations of rotor and stator poles are intended to work together to promote motion in one direction, misalignment will result in some pole pairs unintentionally braking (e.g., stopping or trying to reverse the direction of the motor during certain angular positions of the rotation). This leads to torque ripple from the motor with unwanted vibration and noise. The asymmetry of the magnets on the rotor may reduce the overall lifetime of the motor and produce energy losses that are higher than desirable.

If the winding impedance of the stator coil is ideal, then there will be no delay between asserting the required voltages to commutate the winding current to the time when the direction of the current in the motor windings actually reverses. In practice, the electrical impedance of the motor windings in electric motors, including contributions from the winding inductance and resistance, contribute to a time delay before the current in the windings is changed. At the moment that a commutation event is initiated, this time delay will temporarily prevent the motor winding electromagnets from changing polarity. During this delay interval, the angular position of the rotor and its attached permanent magnets will continue to advance with the wrong relative polarity to the stator electromagnets. This will cause temporary unintentional braking of the motor until the winding current actually changes direction.

The inventor herein has recognized the above mentioned disadvantages and has developed a method for improving motor control by accounting for non-ideal magnet size and positioning on the rotor, and/or for the non-ideal winding impedance. In one embodiment of the present description, a method for controlling a BLDC includes generating a synthesized commutation signal electronically correcting/compensating for errors in rotor magnet positions. In one example, the synthesized commutation signal may additionally or alternatively compensate for the electrical impedance of motor windings, and the method may further include adjusting the synthesized commutation signal responsive to a position of the BLDC motor and responsive to desired speed of the BLDC motor.

By compensating for the non-ideal placement of the rotor magnets with varying geometry, magnets on the rotor may be mathematically aligned with the electromagnets on the stator, providing correction factors that may be used in calculations of rotor position. Other correction factors for the winding impedance may be calculated and/or stored in memory. In addition to correcting for winding impedance and magnet size and/or position, a non-uniform PWM pulse train may be applied during a commutation interval such that individual pulses may have varying (e.g., adjustable) pulse widths. In one example, the pulse train may comprise first few pulses of shorter duration, followed by pulses of increased duration as the commutation interval continues. Finally, the pulse duration may be decreased towards the end of the commutation interval. Such a pulse train adjustment may account for the position of the rotor magnets during rotation at least during some conditions, and may allow for efficient commutation with a uniform torque output.

In one example, it may be desirable to control the average speed of the BLDC motor using PWM signals wherein a PWM waveform may be used to control switches connecting the stator coils to a power supply. This is done in such a way that the average voltage across the motor is equal to the PWM duty cycle multiplied by the voltage of the power supply. PWM control signals are pulse trains where the duty cycle of the signal is defined as the average time high divided by the period. The period of the PWM control signal is typically chosen to be much smaller than the rotational period of the motor. Thus, many PWM pulses may occur evenly distributed within one rotation of the motor. Other methods may also be used to control the speed of the motor including pulse amplitude modulation and other techniques that vary the power delivered to the motor. These various speed control techniques are focused on how to strategically (e.g., optimally) apply energy to the motor between commutation events. The invention described herein includes effective (e.g., optimal) timing of the commutation events and is independent and compatible with the various speed control techniques that vary how energy is delivered to the motor between commutation events. The description provided herein may be used with a single-phase motor with four rotor and four stator poles, but the technique described applies to all rotor pole, stator pole, and winding configurations.

The above advantages and other advantages, and features of the present description will be readily apparent from the following detailed description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The subject matter of the present disclosure will be better understood from reading the following detailed description of non-limiting embodiments, with reference to the attached drawings, wherein:

FIG. 11 shows a first plot for the uncompensated motor and a second plot for the motor compensated for the motor winding impedance and FIG. 12 shows a plot for the motor compensated for both motor winding impedance and asymmetrical rotor magnet geometry.

DETAILED DESCRIPTION

Figure 1:
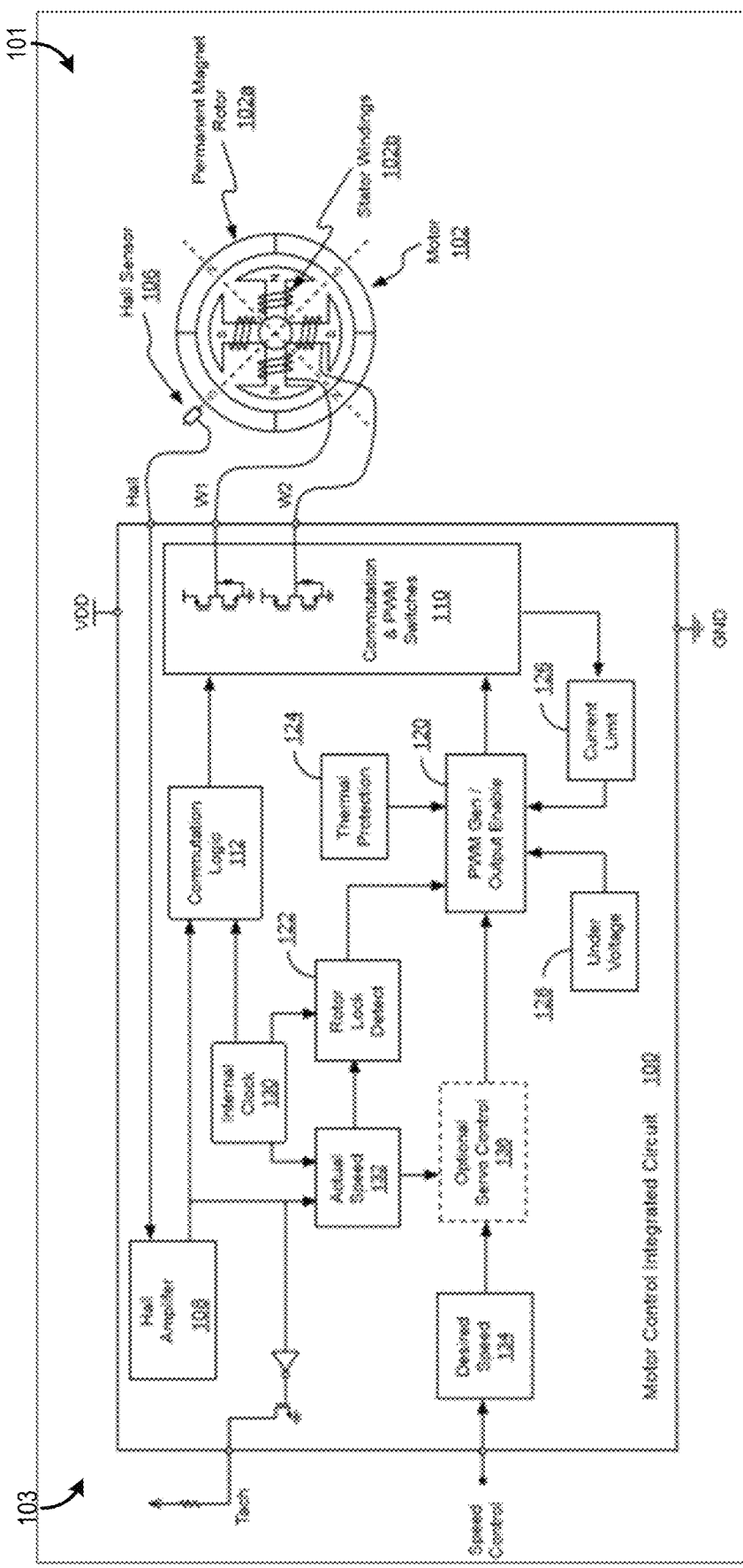
FIG. 1 is a detailed block diagram of an example of a motor control integrated circuit (IC) in a brushless direct current (BLDC) motor system.

FIG. 1 shows a block diagram of an example application for motor system 101 with a motor control integrated circuit 100 in a motor controller 103 electrically connected to a brushless direct current (BLDC) motor 102. Although the motor controller 103 and motor 102 are shown as distinct system components in FIG. 1, it will be understood that the motor controller 103 may be directly integrated into the motor 102 in various embodiments. In one example, the BLDC motor 102 may be a cooling fan, although it could be any BLDC motor. In the cooling fan application a temperature sensor (not shown) reports the system temperature to motor control integrated circuit (IC) 100 in the form of a speed control signal representing the desired speed for the fan. Motor 102 includes a permanent magnet rotor 102a with two pole pairs with the poles labeled N for north and S for south, as shown in FIG. 1. In general, any number of pole pairs can be used, and any stator winding configuration can be used, including single phase as shown in FIG. 1 as well as other multiphase configurations. Motor/rotor movement is controlled by the stator coils, which when energized by current flow and then de-energized, create an alternating magnetic field that propels the rotor. As the rotor spins, the rotor's magnetic pole closest to the Hall effect sensor 106 transitions from north to south and back again.

The Hall effect sensor 106 can either be single ended or have a differential output. In FIG. 1, the output is signal is single ended and is labeled Hall. When the rotor is spinning, the Hall signal may be amplified by the Hall amplifier 108 and may be converted either to a logical 1 or 0 which is interpreted by the Motor control IC 100 as either a north or south pole rotor magnet being closest in position with respect to the Hall effect magnetic sensor. The amplified Hall signal may be pinned out of the IC as an open drain output on the Tach (tachometer) pin. As the rotor spins, and the permanent magnets on the rotor pass by the magnetic sensor, the Tach signal may toggle between a logical one and zero. The rate at which this happens indicates the speed of the motor as monitored by the internal clock block 130 and the actual speed block 132.

Commutation and PWM switches 110 connect the fan's motor windings to the power supply (labeled $V_{DD}$) and ground. The motor control IC 100 uses the magnetic pole information from the Hall effect sensor 106, together with commutation logic block 112, and Commutation and PWM Switches 110 to commutate the current in the stator windings. The Commutation Switches 110 are shown configured as an H-Bridge for the single phase motor shown in FIG. 1, but may also be configured differently for different coil winding configurations and different numbers of stator and rotor poles. The Commutation and PWM switches 110 are shown to be integrated into the motor control IC 100 for illustrative purposes, but may also be external to the IC. In one embodiment, the motor control IC 100, and the Hall effect sensor 106 along with the rotor and stator windings are all physically contained within the cooling fan.

Commutation logic 112 decodes the polarity information of the Hall amplifier output and is used to determine when and which of the commutation and PWM (in this example H-Bridge) switches gets turned on, and ultimately the direction of current flow in the stator windings.

The stator windings are coupled to the power supply through the commutation and PWM switches to ground. The power supply voltage and ground are labeled $V_{DD}$ and GND, respectively. The H-Bridge configuration allows for reversing the direction of the winding current, which will cause the stator magnetic poles to reverse polarity. As the rotor turns, the reversing of the stator winding current is known as commutation. In order to avoid shorting out the power supply to ground during commutation, only one pair of switches is allowed to be on at a time. There is a small delay, known as commutation, delay between when one pair of switches turns off and the other pair of switches turns on. The output pins of the H-Bridge are labeled W1 and W2 for motor winding 1 and 2, respectively.

In one embodiment, a control IC provides several degradation protection features built in for the safety of the motor. FIG. 1 includes the PWM Generator/Output Enable block 120 that provides a PWM input to the commutation and PWM switches to conduct current only if no degradation conditions exist. If a condition of degradation occurs, the PWM Generator/Output Enable block 120 will turn off the switches of motor control IC 100 and disable the current to the stator windings. In the example of FIG. 1, four degradation conditions may be detected which can disable the motor: rotor lock, thermal overload, under-voltage, and current overload. The Rotor Lock Detect block 122 monitors the Hall amplifier output and uses the internal clock to measure the rotor speed. If the rotor speed falls below a preset threshold, it is assumed there is a blockage stopping the rotor and the motor is disabled before unsafe current levels build up in the windings. The motor control IC 100 may have its own thermal sensor located inside the Thermal Protection block 124. As the motor control IC 100 is typically located inside the motor, the IC temperature is an indication of the motor temperature. If the IC temperature rises above a threshold temperature, the motor is disabled. Finally, the stator winding current is sensed across a resistor between the over current protection (OCP) pin and ground. The Over Current Protection block 126 monitors the stator winding current. If the current exceeds a predetermined safety limit, then the motor is disabled. The under voltage block 128 prevents current being delivered to the motor windings if the voltage supply VDD pin falls below the recommended operating condition.

The speed control input tells the motor control IC 100 the desired speed of the motor (e.g., indicated by the desired speed block 134). An optional Closed Servo Control block 136 is shown in dashed lines. As the rotor turns, an internal clock and timer 130 monitors the motor's actual speed as sensed by the Hall amplifier 108. The Servo Control block 136 can dynamically adjust the input to the PWM Generator/Output Enable block 120 until the motor's actual speed equals the motor's desired speed as defined by the output of the Maximum Select (e.g., desired speed) block 134. If closed loop control is not used, the output of the Maximum Select (e.g., desired speed) block 134 is passed directly to the PWM Generator 120. The speed control signal can be in the form of a direct current (DC) voltage, a digital control word, or a PWM signal; each representing the desired speed of the cooling fan.

A pulse width modulation (PWM) generator portion of PWM Generator/Output Enable block 120 adjusts the PWM duty cycle to the switches 110 in order to set the average voltage across the motor windings. As the rotor turns, the motor control IC 100 uses the internal clock 130 and actual speed block 132 to determine the actual speed of the motor. Knowledge of the actual speed of the motor can be used in a closed loop fashion to adjust the PWM duty cycle until the motor's actual speed equals the desired speed. Any type of speed reference, temperature or otherwise, may be measured and used to establish a desired speed for the motor.

Figure 2:
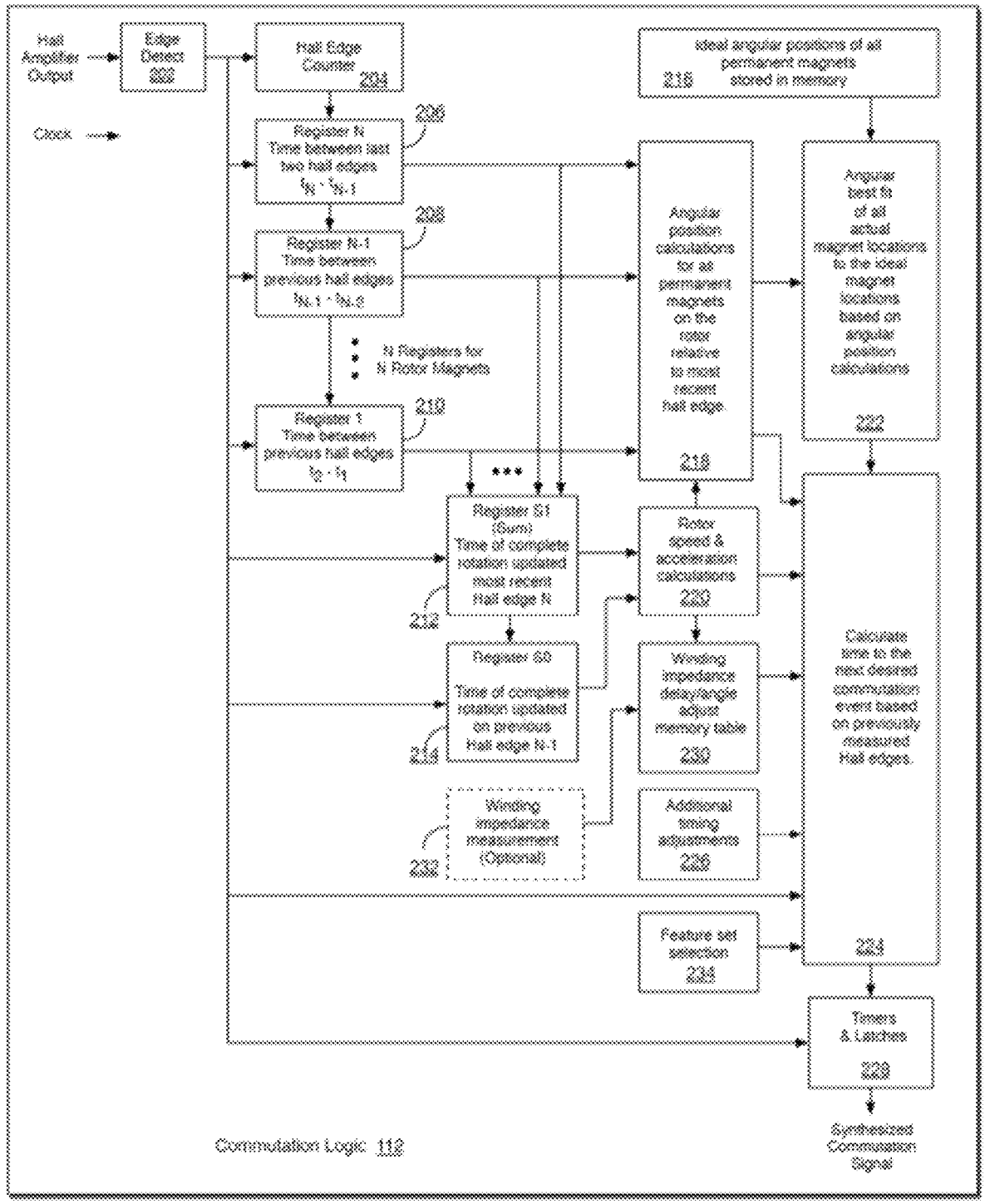
FIG. 2 is a block diagram showing in greater detail the commutation logic block of FIG. 1.

FIG. 2 illustrates a detailed block diagram of the commutation logic block 112 of FIG. 1. Together, these blocks take the Hall amplifier output and generate a synthesized commutation signal that accounts for the manufacturing imperfections in the rotor magnet geometries and the non-ideal winding impedance. As described herein, a non-ideal shape is a shape that does not precisely conform to a desired (e.g., ideal) shape of a component. For instance, components shapes may have unwanted dimensional variances (e.g., manufacturing defects, anomalies, etc.) arising during component manufacturing. For instance, certain manufacturing techniques may have relatively large dimensional tolerances causing the unwanted dimensional variance. The blocks of FIG. 2 may represent different operations performed by the commutation logic block 112 and/or modules (e.g., processing modules, such as processor-executable instructions stored in memory, associated processors/logic units, memory registers, etc.) at which operations are performed. More generally, the blocks described herein with regard to FIG. 2 and other figures may include instructions stored in memory executable by processors, processing circuits, etc., in the motor controller. As such, the blocks may include one or more physical devices or physical device constituents. However, aspects of the instructions described herein alternatively may be propagated by a communication medium (e.g., a control command in the form of an electromagnetic signal, an optical signal, etc.) that is not held by a physical device for a finite duration. Furthermore, the control command, signal, etc., may be non-transitory. The memory devices may include removable and/or built-in devices. To elaborate the memory may include semiconductor memory, optical memory, and/or magnetic memory, among others. Furthermore, the memory may include nonvolatile, volatile, static, dynamic, read/write, read-only, random-access, etc.

When the rotor starts moving, Edge Detect block 202 detects Hall edges (changes in polarity sensed by the magnetic Hall effect sensor) at the output of the Hall amplifier 108 of FIG. 1. Hall Edge counter block 204 detects the time between consecutive edges. This is repeated for each Hall edge, and the recorded times are stored in memory registers at 206, 208, and 210. The system (e.g., the commutation logic 112) includes and/or otherwise has access to N memory registers. There is one memory register for each of the N permanent magnets on the rotor. This provides enough timing information to calculate the time of one complete revolution of the rotor which is performed in block 212. The time of one complete rotation is updated with every detected Hall edge. The two memory registers S1 and S0 of blocks 212 and 214 store the two most recent calculations of the time for one completed rotation. This provides rotor speed and acceleration calculations block 220 the information useable to calculate rotor speed and acceleration. The speed and acceleration information are combined with the times between Hall edges for all N rotor magnets to simultaneously calculate the angular position information for all N rotor magnets, as is performed in block 218. The desired or ideal rotor magnet angular position geometry is stored in block 216. The desired or ideal rotor magnet angular position geometry of block 216 gets compared against the measured geometry in block 222. The angular best fit of the ideal geometry to the measured geometry is also performed in block 222. The angular differences, $\Delta_i$, between the ideal magnet positions and measured magnet positions calculated in block 222 are converted into timing information in block 224 based on speed and acceleration.

Block 230 is memory lookup table containing winding impedance delay information. This memory may be programmed ahead of time with prior knowledge of the winding impedance, and/or the memory may be programmed by optional block 232, which takes motor winding impedance measurements after the motor is powered. The winding impedance memory table 230 may contain a single entry representing the value of the winding impedance delay. If it is desirable to compensate the winding impedance differently at different motor speeds, for different motor types, and/or loading conditions, then memory table 230 will contain multiple values.

Block 224 calculates the time from the most recent Hall edge to the following edge of the synthesized commutation waveform. Inputs to this calculation are the angular position information from block 218, and the best fit angular position information of the rotor permanent magnets from block 222. Inputs also include the rotor speed and acceleration from block 220, the winding impedance delay/angle adjustments from block 230, and any other additional timing adjustments from block 226. The calculation from block 224 is stored in timers and latches block 228 which generates the synthesized commutation signal. The synthesized commutation signal may then be used to commutate the motor winding current instead of using the Hall effect sensor information directly from the Hall amplifier output.

All of the inputs going into block 224 may be used to calculate the next desired Hall edge of the synthesized commutation waveform, or a subset of the inputs may be used. The feature set selection block 234 chooses which inputs to block 224 are used in the calculation and allows for different functionality from the same IC. This can allow for flexibility for the end user or allow for multiple IC products to be offered by the manufacturer with the same IC by enabling and disabling features.

Figure 3:
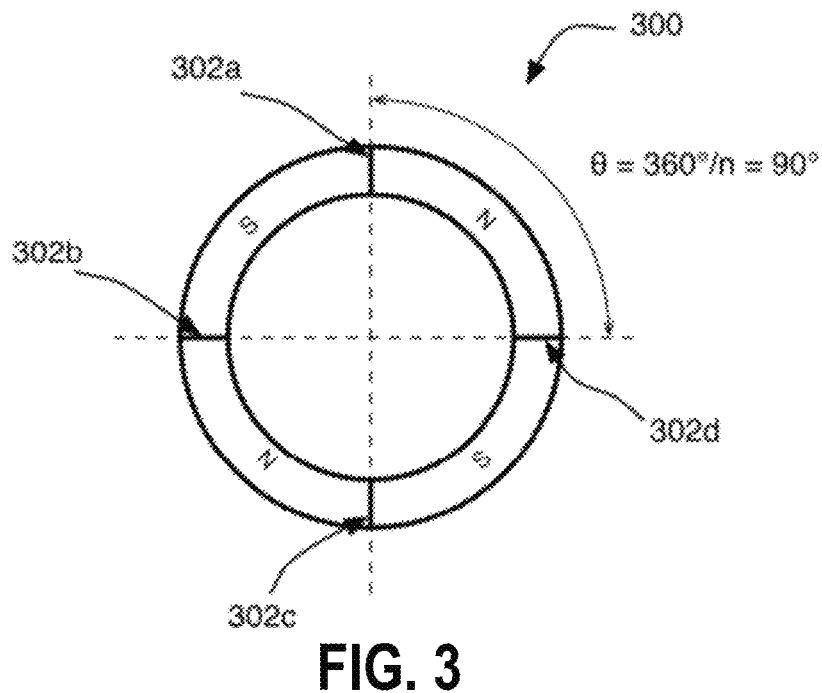
FIG. 3 is an embodiment showing a simplified cross sectional view of a four-pole rotor with symmetrically positioned permanent magnets on the rotor.

FIG. 3 is an embodiment showing a simplified cross sectional view of a rotor 300 with symmetrically positioned permanent magnets that have identical geometry to one another. The positions between the magnets are equally spaced at locations 302a, 302b, 302c, and 302d. In the illustrated example, four rotor magnets are placed equidistant from each other wherein θ describes the rotor angle between any two magnetic pole interfaces (e.g., the angle between rotor positions that generates a change in the sensed magnetic polarity) on the rotor. For a rotor, with two pairs of symmetrically spaced magnetic poles having identical or substantially equal sizes and/or dimensions such as is shown by the rotor 300 of FIG. 3, θ equals 360°/4, or 90°.

Figure 4:
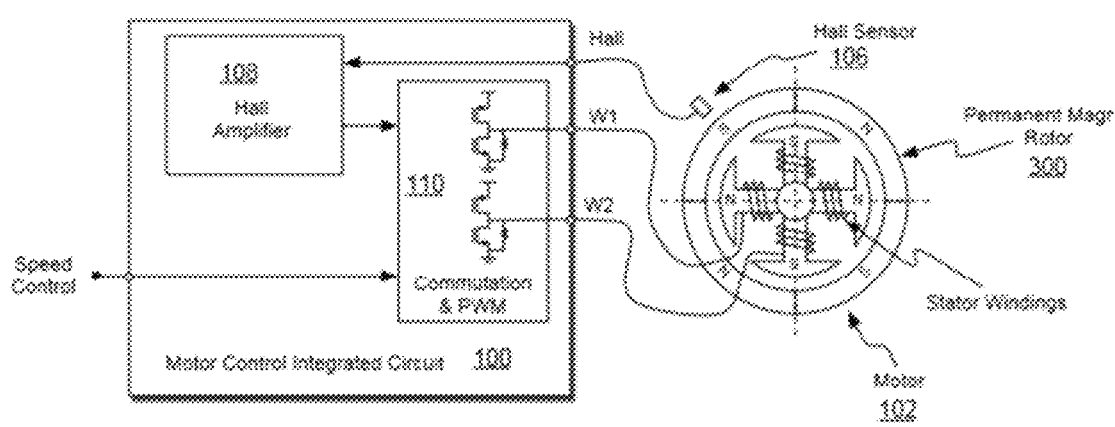
FIG. 4 is a block diagram showing an embodiment of the motor control IC of FIG. 1 together with the rotor of FIG. 3.

FIG. 4 shows a block diagram of an embodiment of the motor control IC 100 that is coupled to the motor 102 with the rotor 300 of FIG. 3, with symmetrically positioned and sized permanent magnets. While the illustrated example of FIG. 4 is shown with the motor control IC 100 of FIG. 1, it is to be understood that one or more components of the motor control IC 100 of FIG. 1 may be altered or removed and one or more additional components may be included in the motor control IC without departing from the scope of the disclosure. As shown in FIG. 4, the Hall amplifier 108 output reports when a magnetic pole closest to the Hall effect sensor 106 transitions from north to south and back again as the rotor spins.

Figure 5:
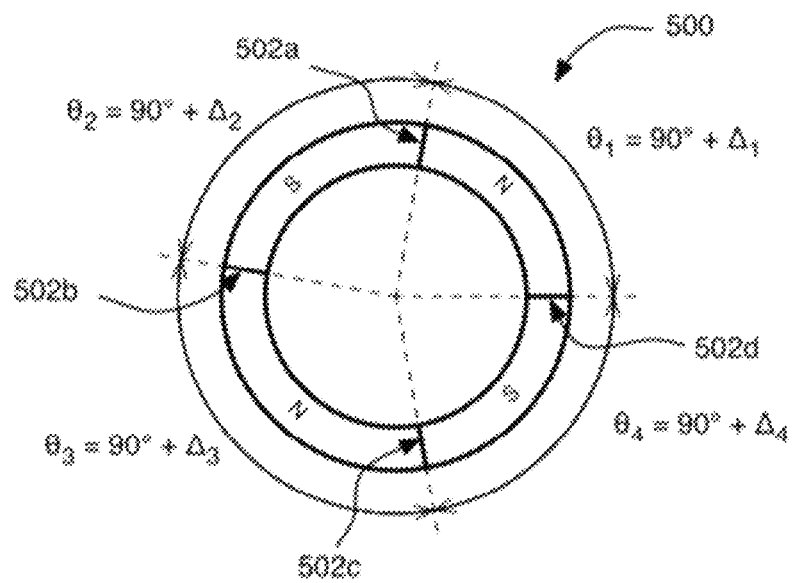
FIG. 5 is another embodiment showing a simplified cross sectional view of a four-pole rotor with asymmetrically positioned permanent magnets on the rotor.
Figure 6:
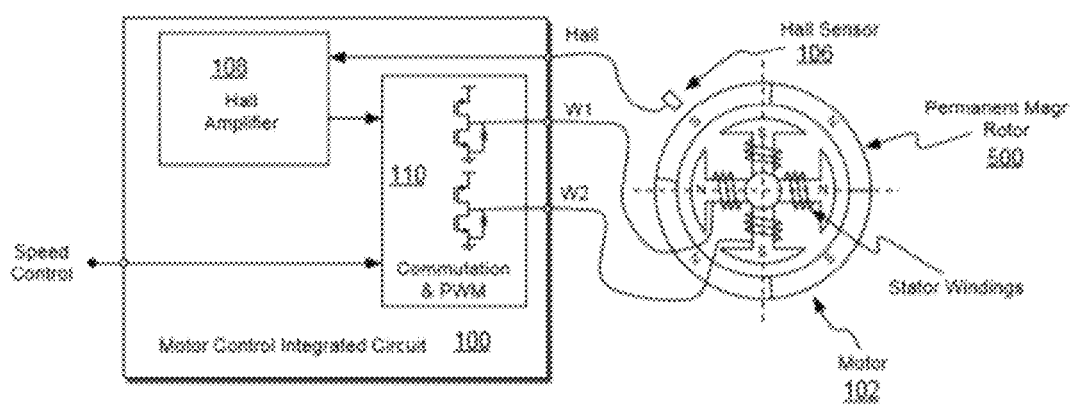
FIG. 6 is a block diagram showing another embodiment of the motor control IC of FIG. 1 together with the rotor of FIG. 5.

Referring now to FIG. 5, depicting another embodiment of a simplified cross sectional view of an example rotor 500 with asymmetrically shaped permanent magnets. This results in asymmetrically and non-ideally spaced positions between the magnets at locations 502a, 502b, 502c, and 502d on the rotor as shown. As mentioned above, in one example the permanent rotor magnets may be positioned asymmetrically in the rotor, or in another example may be magnets with varying geometries. In still other examples, the permanent rotor magnets may be a combination of having asymmetrical positions relative to one another and irregular/different geometries from one another. When a rotor with variable magnet geometry and/or arrangement is placed in a motor, such as is shown in FIG. 6, the output of the Hall amplifier 108 may not detect the magnetic pole of permanent magnets on the rotor as the same time as would be expected for a rotor having identical magnets positioned symmetrically (e.g., as shown in FIGS. 3 and 4). Such physical differences in the rotor magnets may be compensated for error in position, so as to achieve more uniform torque and improved (e.g., optimal) performance from the motor. Since each of the magnetic poles may include variability in either positioning or size/dimension, each magnet on the rotor may be associated with an individual compensation factor to correct for position variation as determined by the Hall effect sensors. For example, as described above, the rising and falling edges of the Hall amplifier output are edge detected at times $t_1$, $t_2$, $t_3$ and $t_4$. Due to the irregular geometry and/or placement of the magnets in the example of FIG. 6, the absolute rotor position is not precisely known at the rising and falling edges. However, the measured times between Hall edges may be detected and compared to expected (e.g., based on a configuration in which the magnets are placed symmetrically on the rotor as described above with respect to FIGS. 3 and 4) times between Hall edges based on rotor speed and acceleration in order to determine angle correction factors for each magnet (an example algorithm for determining the correction factor is described below with respect to FIGS. 8 and 9). Once each correction factor (one for each permanent magnet of the rotor, where each correction factor is associated with an angle between adjacent permanent magnets of the rotor) has been calculated, the correction factors may be used in the calculation of a best fit angular position of the ideal rotor geometry with respect the non-ideal motor geometry being measured.

Figure 7:
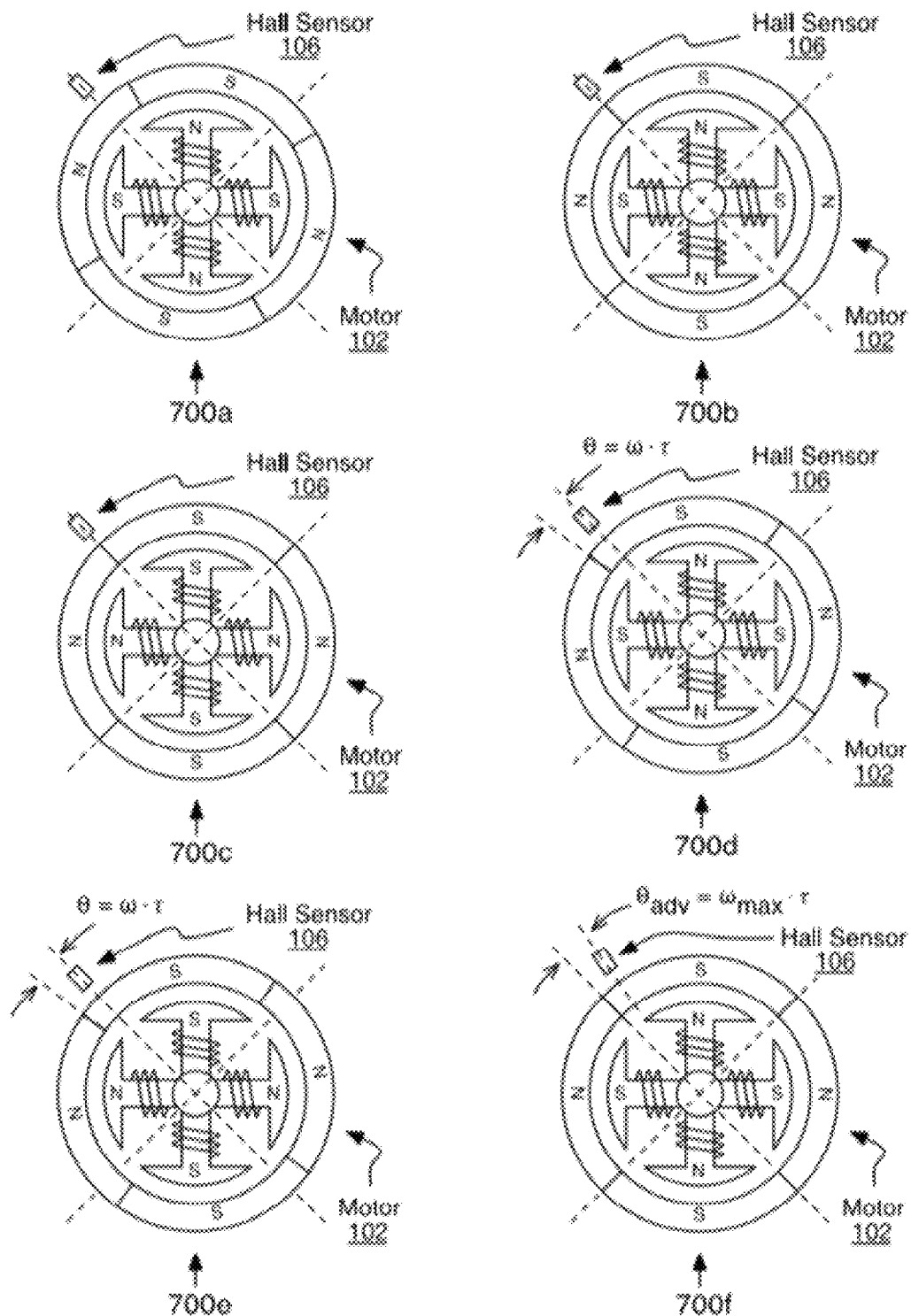
FIG. 7 shows the relationship of winding impedance delay to the angular position of the Hall effect sensor and rotor for an example in which the rotor is rotating counter clockwise.

FIG. 7 shows the motor 102 at six different combinations of the angular position of the rotor relative to the stator electromagnet polarities, and the position of the Hall Sensor 106. These combinations will be used to show the problem caused by the motor winding impedance delay, and a prior solution. For illustrative purposes, FIG. 7 relates to an example in which the rotor is rotating counter clockwise. In 700a, the polarity of the rotor and stator magnet poles are labeled N and S for north and south, respectively. Like poles repel, and opposite poles attract. This will cause the rotor of 700a to rotate in the counter clockwise direction. The rotor will continue in the counter clockwise direction until it reaches the position shown in 700b. Ideally at this position, the Hall Sensor 106 will detect a change in polarity from north to south on the rotor. This will initiate the control IC to commutate (reverse) the direction of the stator winding current, causing the electromagnets of the stator to change polarity as shown in 700c. Although the magnets' polarities are such in 700c that they will not induce rotation, the angular momentum of the rotor will cause the rotor to move slightly past this angle resulting in the magnets to continuing to promote rotation in the counter clockwise direction. Real BLDC motors have a time delay between when commutation is initiated to when the current actually reverses in the windings caused by the non-ideal impedance of the stator coils. When the Hall effect sensor 106 in 700a detects a polarity change in the rotor magnets, the rotor will continue to rotate for a time, $\tau$, which equals the winding impedance time delay, before the rotor electromagnets can change polarity as shown in 700d and 700e. The angle, $\theta$, at which the rotor continues to rotate before actual commutation takes place, is equal to the angular velocity, $\omega$, multiplied by the time constant, $\tau$, of the motor windings. During the time, $\tau$, the polarity of the stator electromagnets will have the wrong polarity in relation to the rotor permanent magnets, and promote rotation in the clockwise direction, instead of the counter clockwise direction. This will cause the motor to brake n times per rotation, where n is the number of rotor poles. A prior solution to this problem is to advance the Hall effect sensor by an angle, $\theta_{adv}$, as shown in 700f. Typically the advance angle, $\theta_{adv}$, is set to compensate the maximum angular velocity of the rotor, $\omega_{max}$. The drawback to this solution is that it only works at one speed. As a consequence, the motor performance will still be degraded in terms of power consumption and vibration, by unwanted braking at other rotor speeds. The systems and methods described herein can eliminates the need to physically advance the Hall effect sensor, and compensates for the motor winding impedance at all motor speeds, if desired. Thus, the present description includes an IC having a commutation logic block that produces a synthesized commutation signal.

Figure 8:
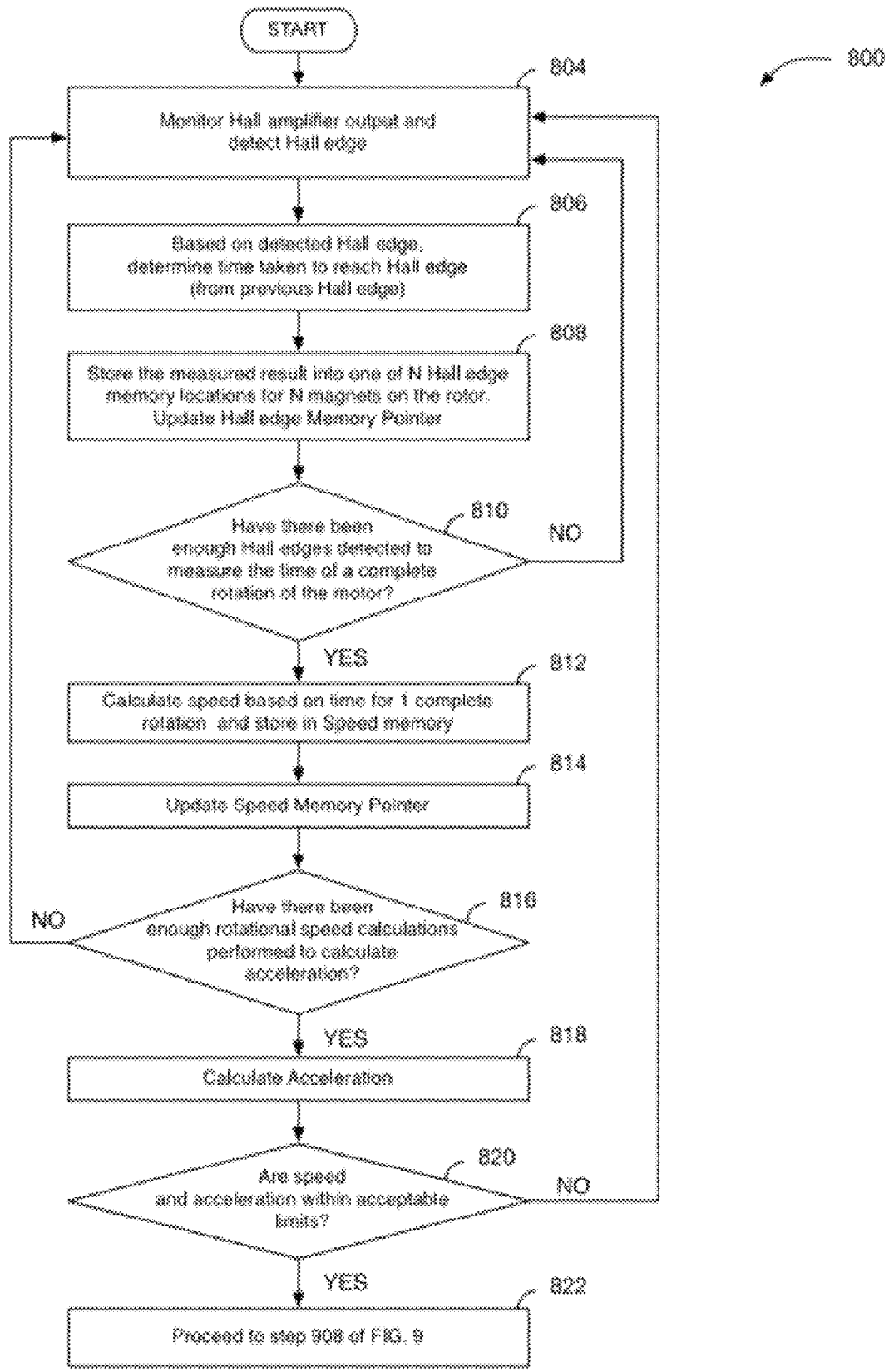
FIGS. 8 and 9 are flowcharts of an embodiment of a method for compensating for a variation in magnet size and/or position of the rotor, and the winding impedance delay.
Figure 9:
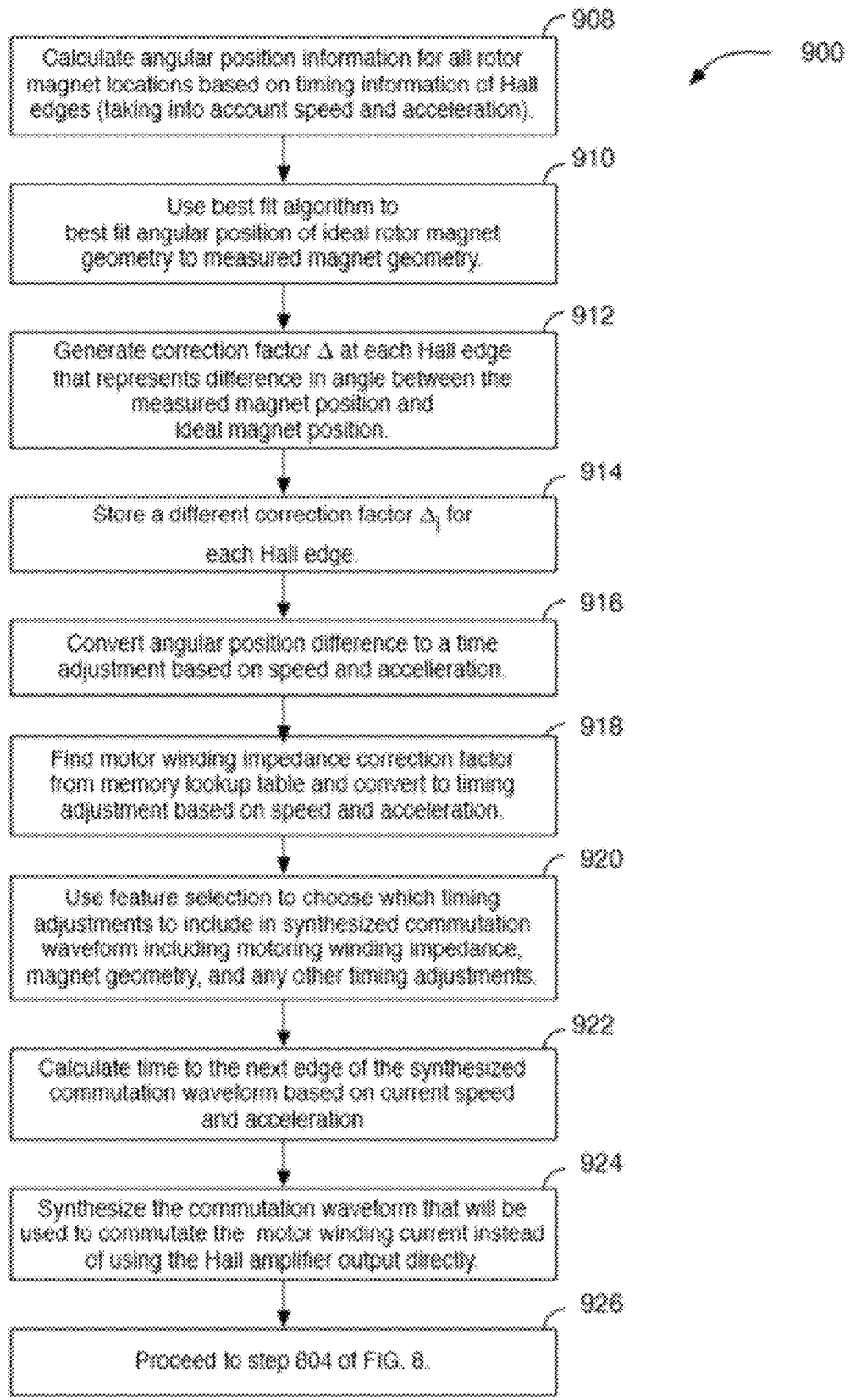

FIGS. 8 and 9 show flowcharts of an example of a method 800 and 900, respectively, for compensating for a variation in magnet size and/or magnet position of the rotor, and the impedance of the motor windings. For example, the motor control integrated circuit 100 of FIG. 1, FIG. 4, FIG. 6, combinations thereof, etc., may perform the method 800 and 900. The methods include recording the time between the edges of the Hall amplifier output as the rotor moves past the stationary Hall effect sensor. Timing information is recorded and stored for the entire rotation of the motor. Speed and acceleration of the rotor are calculated based on an entire rotation of the rotor and are updated at every Hall edge. Once the speed and acceleration of the rotor are known, the relative angular position of the all permanent magnets on the rotor is calculated simultaneously based on the recorded time between the Hall edges. Speed and acceleration are checked to make sure an accurate calculation of angular position can be made. Once the angular positions of the rotor magnets are determined, the relative positions of the rotor magnets may be compared again to the ideal magnet positions of a perfectly manufactured rotor. If there is a difference, the difference in angle, $\Delta_i$, is stored for each magnet on the rotor. The desired (e.g., optimal) angular position of an ideal rotor relative to the magnet positions of the rotor being measured may then be calculated. In one example, the best fit is found using a recursive least squares (RLS) approximation between the non-ideal Hall edges and the ideal Hall edge locations. Other best fit algorithms such as least mean squares may also be used. Once the best fit angular position of the ideal rotor is known, it is combined with the speed and acceleration information to convert the angle to timing information. This timing information may be used together with the motor winding impedance delay information to generate the synthesized commutation waveform, which may then be used to commutate the stator winding current instead of using the Hall effect sensor information directly.

FIGS. 8 and 9 may be combined to form a flowchart of an embodiment of a method 800 and 900 for compensating for asymmetrical rotor magnets and the motor winding impedance, and creating a synthesized commutation waveform. At 804, the method includes constantly monitoring a Hall amplifier output to detect the first Hall edge after the rotor begins to move. As mentioned with reference to FIG. 8, once a Hall edge is detected, a time has been taken to reach the current Hall edge (from the previous Hall edge) if one has occurred already. The time is measured 806 and stored into one of N memory locations at 808 corresponding to N permanent magnets on the rotor. As shown at decision block 810, the method includes counting the amount of Hall edges to make sure an entire revolution (e.g., 360 degree revolution) of the motor has occurred. If enough Hall edges have not been detected to measure the time of a complete rotation/revolution of the motor (e.g., "NO" at 810), the method returns to 804 to continue monitoring Hall amplifier output and detecting Hall edges. If enough Hall edges have been detected to measure the time of a complete rotation/revolution of the motor (e.g., "YES" at 812), the method continues to 812 to calculate speed based on time for one complete rotation. The speed is calculated at 812 after 1 revolution because the speed calculation is not affected by rotor magnet asymmetry if the timing measurements are based on integer multiples of an entire revolution. The speed calculation is stored in memory at 812 and the memory pointer is updated, as indicated at 814. Two separate speed calculations are used to calculate acceleration. As shown at decision block 816, the method includes making sure two speed measurements are stored in memory before the acceleration calculation is performed at 818. If there have not been enough rotational speed calculations performed to calculate accelerations (e.g., "NO" at 816), the method returns to 804 to continue monitoring Hall amplifier output and detecting Hall edges. If there have been enough rotational speed calculations performed to calculate accelerations (e.g., "YES" at 816), the method continues to 818 to perform the acceleration calculation as described above. As shown at decision block 820, the method includes checking to make sure that speed and acceleration are within acceptable limits to make an accurate synthesized commutation waveform. If the speed and acceleration are within acceptable limits (e.g., "YES" at 820), then the method proceeds to block 908 of FIG. 9. If the speed and acceleration are not within acceptable limits (e.g., "NO" at 820), the method includes returning to 804 to continue monitoring Hall amplifier output and detecting Hall edges.

FIG. 9 is the second half of the flow chart that began in FIG. 8. In order to arrive at block 908 of FIG. 9, three things have occurred: 1. The time between hall edges has been stored in memory for every magnet sensed for an entire revolution, 2. The rotor speed calculation based on the most recent Hall edge has been determined to be accurate, and 3. The rotor acceleration calculation based on the most recent Hall edge has been determined to be accurate. All three conditions may be used to make an accurate angular position calculation for all N rotor magnets simultaneously based on the timing of the detected Hall edges, which is performed at 908 of method 900.

At 910, the method includes comparing the calculated rotor magnet positions against the ideal magnet positions. The best fit of the angular position of the ideal magnet location to the measured locations is performed using a recursive least squares method. Other best fit algorithms such as least mean squares may also be used.

At 912, the method includes generating differences in angular position of the measured rotor magnet positions relative to the desired (e.g., ideal) locations for all N rotor magnets Δi. At 914, the method includes storing a different correction factor Δi for each Hall edge into memory. At 916, the method includes converting this angular position difference into an adjusted time difference from the ideal Hall edge based on speed and acceleration.

At 918, the method includes finding the winding impedance timing adjustment from the memory lookup table which may be based on speed, motor type, and/or loading condition. At 920, the method includes using the feature selection block to choose which timing adjustments will be used in generating the synthesized commutation waveform including the motor winding impedance timing adjustments, the best fit rotor magnet adjustments, and/or any other desired timing adjustments. At 922 the time from the most recent detected Hall edge to the following edge of the synthesized commutation waveform is calculated based on the current speed and acceleration. At 924, the calculations are used to synthesize the commutation waveform that will be used to commutate the motor winding current instead of using the Hall amplifier output directly. It will be appreciated that the synthesized commutation waveform may be used for motor control. As such, the method may further including adjusting the PWM switches using the synthesized commutation signal and using the PWM signal to drive the motor. As the synthesized commutation waveform is continually updated, at 926 the method includes returning to block 804 of FIG. 8 to continue monitoring Hall amplifier output and detecting Hall edges.

Figure 10:
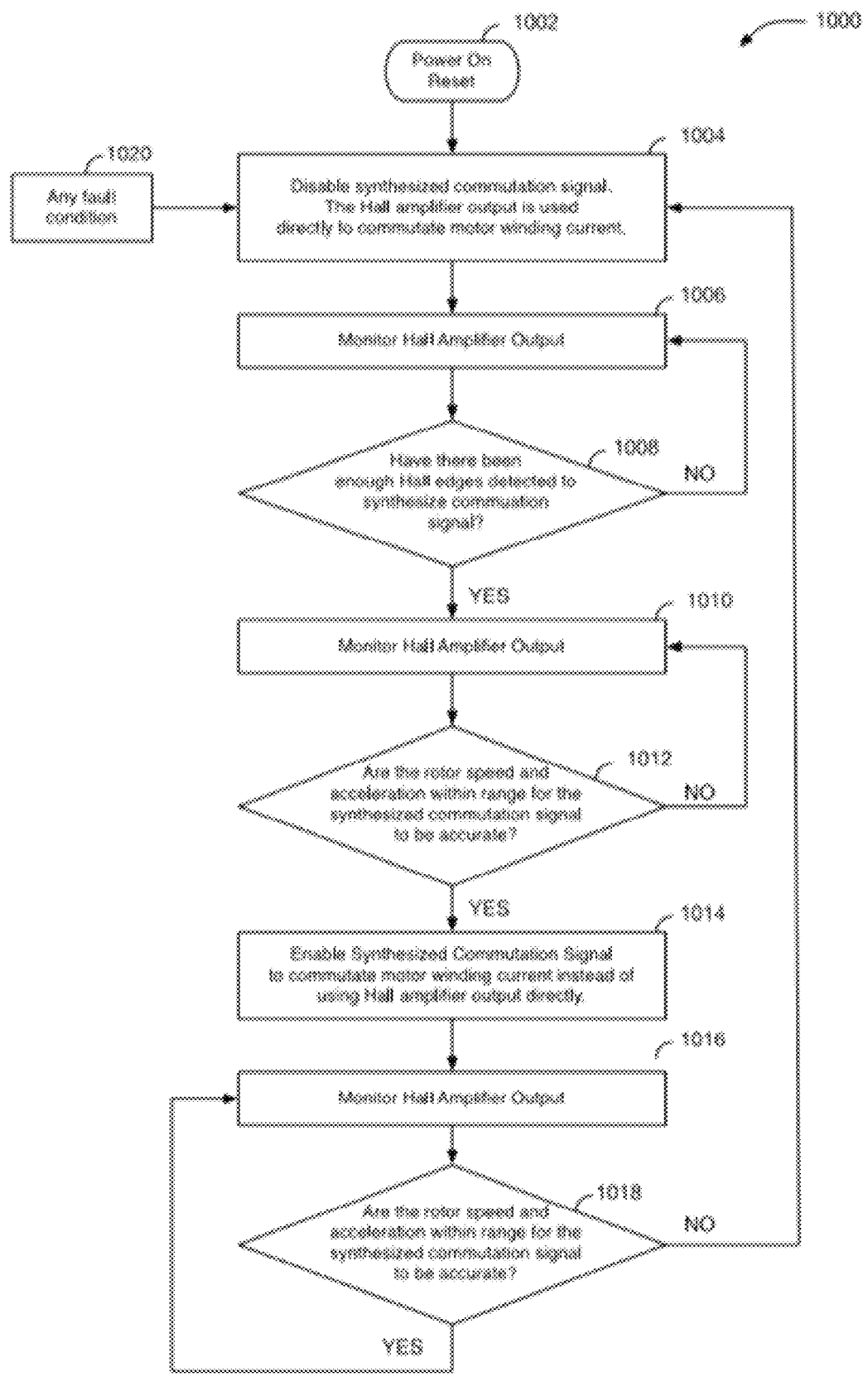
FIG. 10 is a flowchart of an embodiment of a method for controlling when a synthesized commutation signal is enabled.

FIG. 10 is a flow chart of an example of a method 1000 for controlling when the synthesized commutation waveform is enabled. Special precautions are used during degradation (fault) conditions and when power is first applied to the motor.

At 1002, power is applied to the motor (and the motor control IC, such as motor control IC 100 of FIG. 1) at a startup or reset condition. At 1004, the power on reset signal disables the synthesized commutation signal.

At 1006, the method includes constantly monitoring the Hall amplifier to determine the rotor speed. At 1008, the method includes determining if enough Hall edges have occurred to make a calculation. If the rotor is not spinning faster than the predetermined speed (e.g., if there have not been enough Hall edges to make a calculation, "NO" at 1008), the method returns to 1004 to monitor the Hall amplifier output until such time as a complete calculation can be made. If enough Hall edges have been detected to make a calculation (e.g., "YES" at 1008), the method includes monitoring the Hall amplifier again, as indicated at 1010. At 1012, the method includes determining whether the speed and acceleration of the rotor are such to make accurate calculations (e.g., enable a target level of accuracy of the calculation to be achieved). If the speed and acceleration of the rotor are not within a range for the synthesized commutation signal to be accurate (e.g., "NO" at 1012), the synthesized waveform remains disabled and the method returns to 1010 to continue to monitor Hall amplifier output.

If the speed and acceleration of the rotor are within the range for the synthesized commutation signal to be accurate (e.g., "YES" at 1012), the method proceeds to 1014 and includes enabling the synthesized commutation signal (e.g., where commutation is position corrected). At 1016, after the DAC output is enabled, the method includes monitoring the Hall amplifier output to determine the rotor speed. At 1018, the method includes determining if the synthesized commutation waveform is being accurately generated. If the rotor speed and acceleration are within range for the synthesized commutation signal to be accurate (e.g., "YES" at 1018), then the DAC remains enabled and the method returns to 1016 to continue monitoring the Hall amplifier output. If the rotor speed and acceleration are not within range for the synthesized commutation signal to be accurate (e.g., "NO" at 1018), then the method returns to 1004 where the synthesized commutation waveform is disabled.

Conditions of degradation may result in the rotor coming to a complete stop. At 1020, a degradation condition is detected and the method moves to 1004 where the synthesized commutation waveform is disabled. In such an example, the degradation or fault condition may serve as an interrupt command to begin the method 1000. Therefore, all conditions of degradation automatically disable the synthesized commutation waveform until the rotor starts spinning again and rotor speed and acceleration are such that the synthesized commutation waveform can be re-enabled. Accordingly, the synthesized commutation waveform may be disabled in response to a variety of operation conditions including degradation conditions, startup, and/or reset conditions, then re-enabled to ensure operation of the motor.

Figure 11:
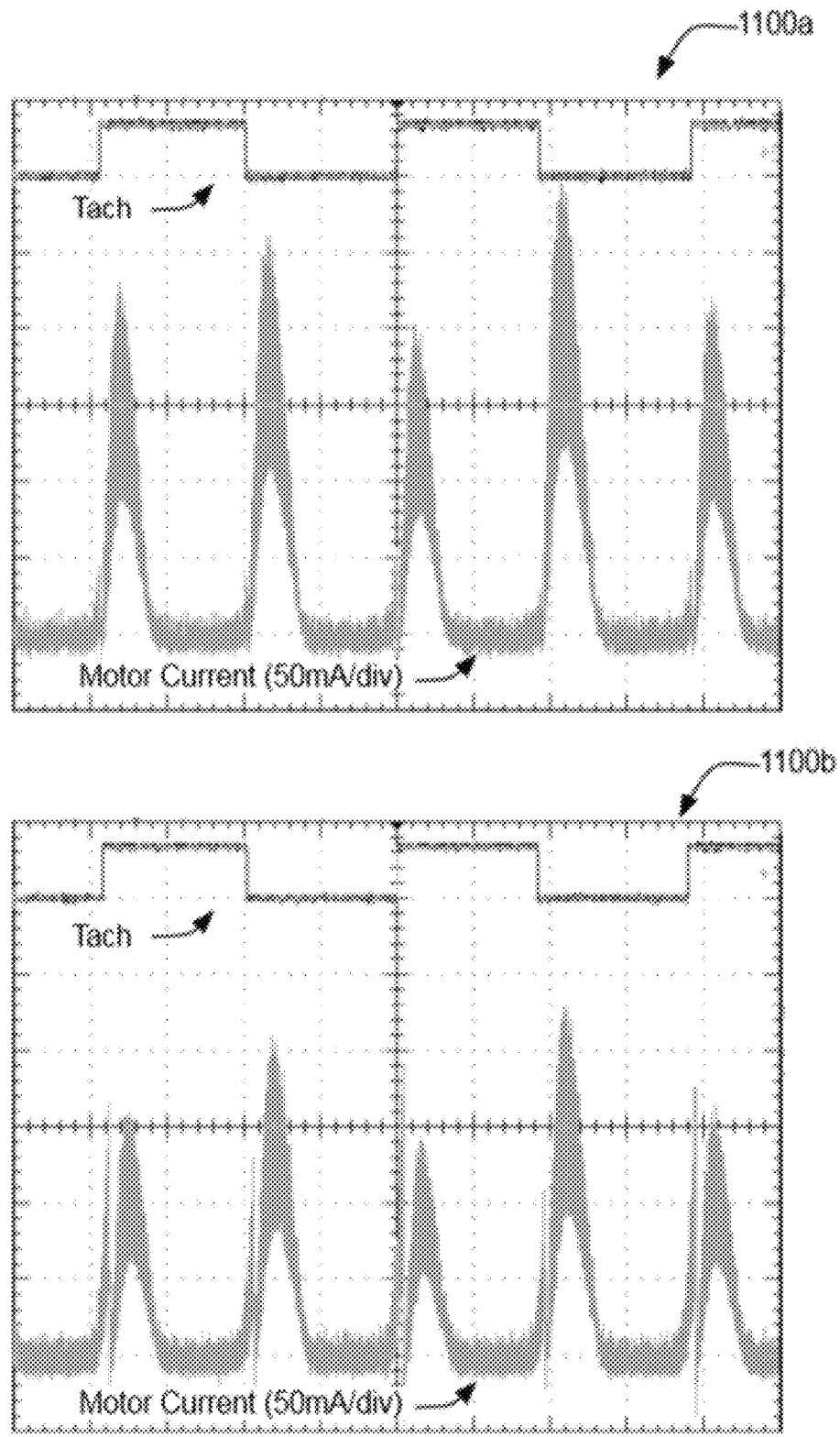
FIGS. 11 and 12 show oscilloscope plots comparing the current waveforms of an actual BLDC motor using traditional PWM speed control before and after compensation with a synthesized commutation waveform, where
Figure 12:
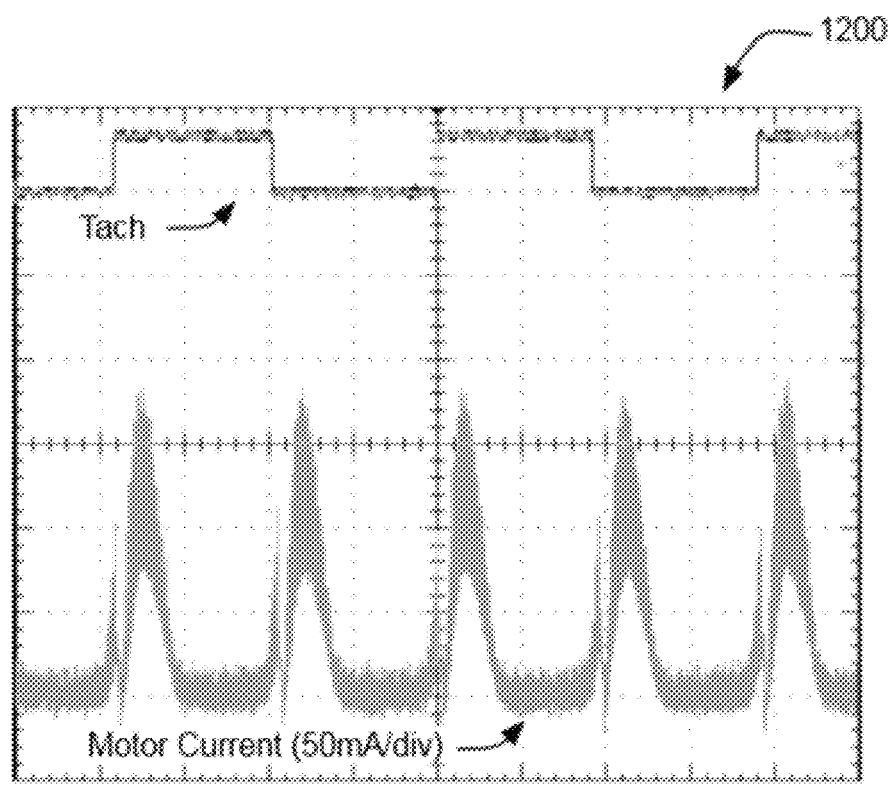

FIGS. 11 and 12 show use-case oscilloscope plots comparing the current waveforms of an actual BLDC motor that has manufacturing defects resulting in asymmetry of rotor magnet geometry and position and winding delay resulting from the impedance of the stator windings. The plots also display the amplified Hall signal pinned as output on the Tach (tachometer) pin. As the rotor spins the Tach signal toggles between a logical one and zero. For the four pole motor that was used in these plots, there is one transition on Tach from low to high, or from high to low, for one quarter rotation of the motor. The rate at which the Tach edges happen indicates the speed of the motor. The horizontal axis represents time. The exact same motor was used for plots 1100a, 1100b, and 1200. The speed of the motor for all three plots is the same, and the PWM techniques used to energize the motor windings in between commutation events is the same. The only differences between the three plots are the position of the Hall effect sensor, and the way in which the commutation waveforms are generated.

Plot 1100a of FIG. 11 shows a current waveform of the motor when uncompensated for asymmetrical rotor magnets and winding impedance delay (e.g., when a synthesized commutation waveform according to the present disclosure is not applied). Plot 1100b of FIG. 11 shows a current waveform of the same motor when compensated using a synthesized commutation waveform for winding impedance delay only. Finally, plot 1200 of FIG. 12 shows a current waveform of the same motor when compensated using a synthesized commutation waveform for both winding impedance delay and asymmetrical magnets.

Plot 1100a shows the motor winding current plot for a prior solution. The Hall effect sensor has been advanced by an angle, $\theta_{adv}$, as discussed above with respect to FIG. 7, to compensate the winding impedance delay at the maximum angular velocity of the rotor, $\omega_{max}$. The commutation waveform is taken from the Hall effect sensor output directly. The drawback to this solution is that the angle advance, $\theta_{adv}$, only corrects the winding impedance time delay properly at one angular velocity. At velocities below $\omega_{max}$, the Hall effect sensor advance angle results in too much time advance, and the winding impedance delay will be overcompensated. In plot 1100a the velocity of the motor is below $\omega_{max}$, and the winding impedance delay is over compensated resulting in non-optimal performance.

Plot 1100b shows a plot of the motor winding current with the exact same motor running at the same speed as used for plot 1100a. In plot 1100b, the position of the Hall effect sensor was been changed so the advance angle, $\theta_{adv}$, is zero. A synthesized commutation waveform is used to compensate the winding impedance and commutate the winding current instead of advancing the angle of the Hall effect sensor and using the Hall effect sensor output directly to commutate the winding current. A single time constant was used in the memory table 230 of FIG. 2 to compensate for the winding impedance delay. The time constant, $\tau$, was chosen using the equation $\theta_{adv}=\omega_{max}\cdot\tau$, so that at the maximum velocity, $\omega_{max}$, the motor performed identically as when the Hall effect sensor was mechanically advanced. The benefit of this approach is that the motor winding impedance delay does not change with motor speed and the motor remains properly compensated at other (in this example slower) speeds. For this example, in plot 1100b the peak current is about twenty five percent less, and overall power consumption is about five percent less than in plot 1100a, even though the motor is running at the same speed.

Plots 1100a and 1100b of FIG. 11 show the current waveform with varying peak amplitudes that correspond to the varying geometry of the rotor magnets. The misalignment causes some stator and rotor combinations to brake the motor near the interface between rotor magnets instead of promoting rotation in the desired direction. This causes the peak current to be higher than would be expected of an ideally manufactured rotor. The above-described braking caused by the misalignment also results in wasted energy and generation of heat in the motor windings, and unwanted torque variation.

In contrast to plot 1100b, FIG. 12 (plot 1200) shows an oscilloscope plot of the current waveform with both the angular best fit block 222 and the winding impedance block 230 of FIG. 2 enabled. By enabling block 222, the timing of the edges of the synthesized commutation waveform has been adjusted to compensate for the varying geometry and position of the rotor magnets. The speed of the motor used to generate plot 1200 is the same as for plots 1100a and 1100b, and the same PWM techniques were used to set the speed of the motor. The variation in peak current of the motor is minimized in 1200. Due to the minimization of the effect of unwanted braking near the magnet edges, the required peak current to run the motor at the same speed is reduced. In plot 1200 overall power consumption is reduced an additional three percent compared to plot 1100b.

Figure 13:
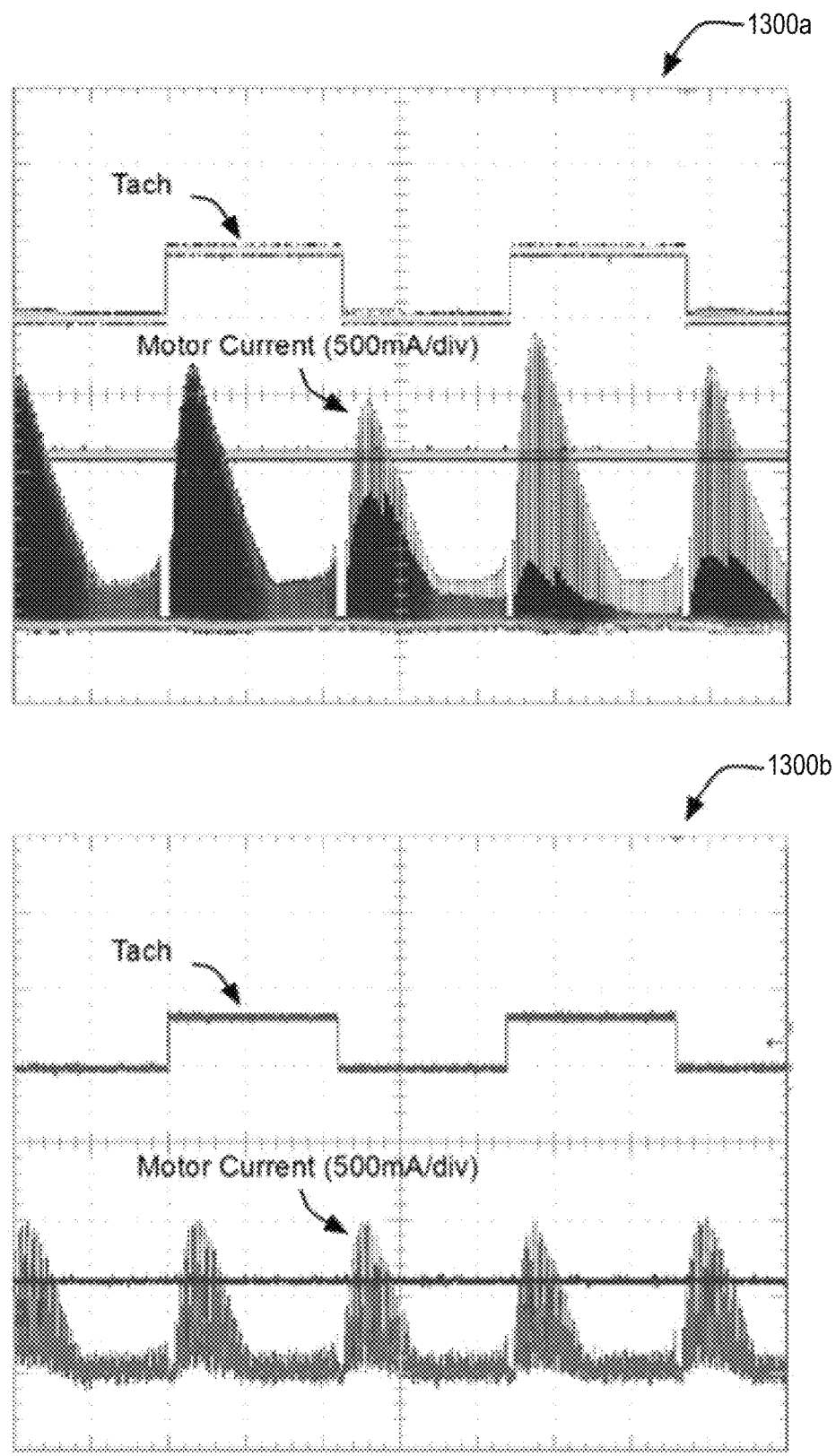
FIG. 13 shows oscilloscope plots comparing the current waveforms of an actual BLDC motor using traditional PWM speed control, where the top plot shows the current waveforms resulting from non-ideally manufactured rotor magnets and the bottom plot shows current waveforms of the exact same BLDC motor running at the same speed using the same PWM speed control methods, but compensated for the asymmetry of rotor magnets using a synthesized commutation signal.

FIG. 13 depict other use-case oscilloscope plots comparing the current waveforms of an actual BLDC motor that has manufacturing defects resulting in asymmetry of rotor magnet geometry and position. The graph also displays the amplified Hall signal pinned as output on the Tach (tachometer) pin. As the rotor spins the Tach signal toggles between a logical one and zero. For the four pole motor that was used in these plots, there is one transition on Tach from low to high, or from high to low, for one quarter rotation of the motor. The rate at which the Tach edges happen indicates the speed of the motor. The third trace on both oscilloscope plots is not used and may be ignored. The horizontal axis represents time. The exact same motor was used for both plots 1300a and 1300b. The speed of the motor for both plots is the same, and the PWM techniques used to energize the motor windings in between commutation events is the same.

The only difference is that in plot 1300a, the synthesized commutation signal was disabled, and the Hall amplifier output was used directly to commutate the motor current. In 1300b, the synthesized commutation signal was enabled.

The top plot 1300a of FIG. 13 shows the current waveform with varying peak amplitudes that correspond to the varying geometry of the rotor magnets. The misalignment causes some stator and rotor combinations to brake the motor near the interface between rotor magnets instead of promoting rotation in the desired direction. This causes the peak current to be higher than would be expected of an ideally manufactured rotor. The above-described braking caused by the misalignment also results in wasted energy and generation of heat in the motor windings, and unwanted torque variation.

In contrast, the bottom plot 1300b of FIG. 13 shows an oscilloscope plot of the current waveforms of the exact same BLDC motor as used to generate the plot 1300a, with the synthesized commutation signal enabled to compensate for the varying magnet geometry and with position of the rotor magnets. The speed of the motor used to generate plots 1300a and 1300b is the same, and the same PWM techniques were used to set the speed of the motor for plots 1300a and 1300b. The variation in peak current of the motor current waveform is minimized in plot 1300b. Due to the minimization of the effect of unwanted braking near the magnet edges, the required peak current required to run the motor at the same speed is also reduced.

Figure 14:
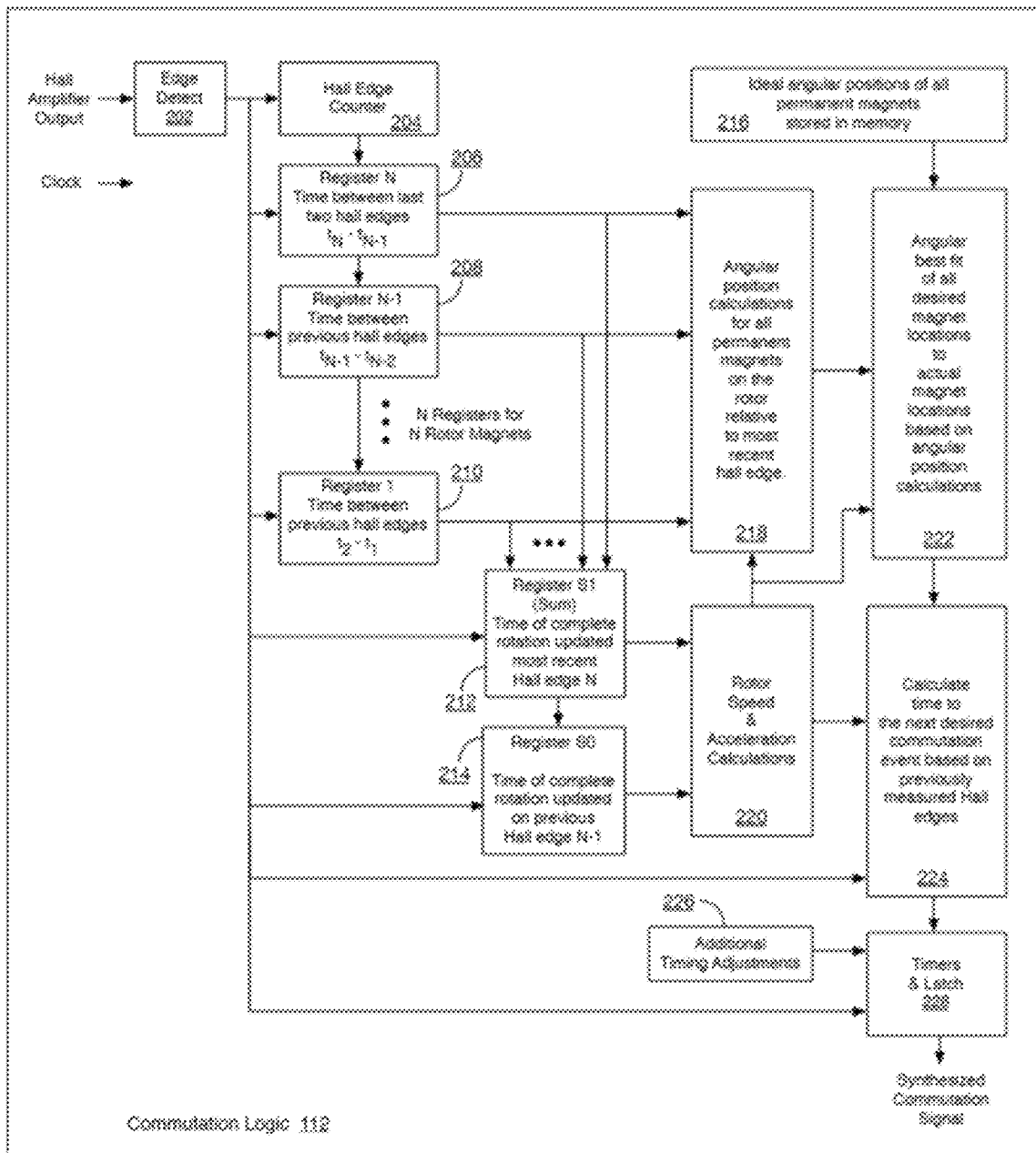
FIG. 14 shows another embodiment of the commutation logic block of FIG. 1.

FIG. 14 shows another embodiment of the commutation logic block 112. The communication logic block shown in FIG. 14 shares many similarities with the commutation logic block 112, shown in FIG. 2. As such, redundant description is omitted for brevity. As shown in FIG. 14, the commutation logic block 112 takes into account magnet asymmetry when generating the synthesized commutation signal. However, the commutation logic block 112 depicted in FIG. 14 does not take into account the winding impedance delay. Nevertheless, as previously discussed embodiments taking into account both winding impedance delay and magnet asymmetric have been envisioned.

Figure 15:
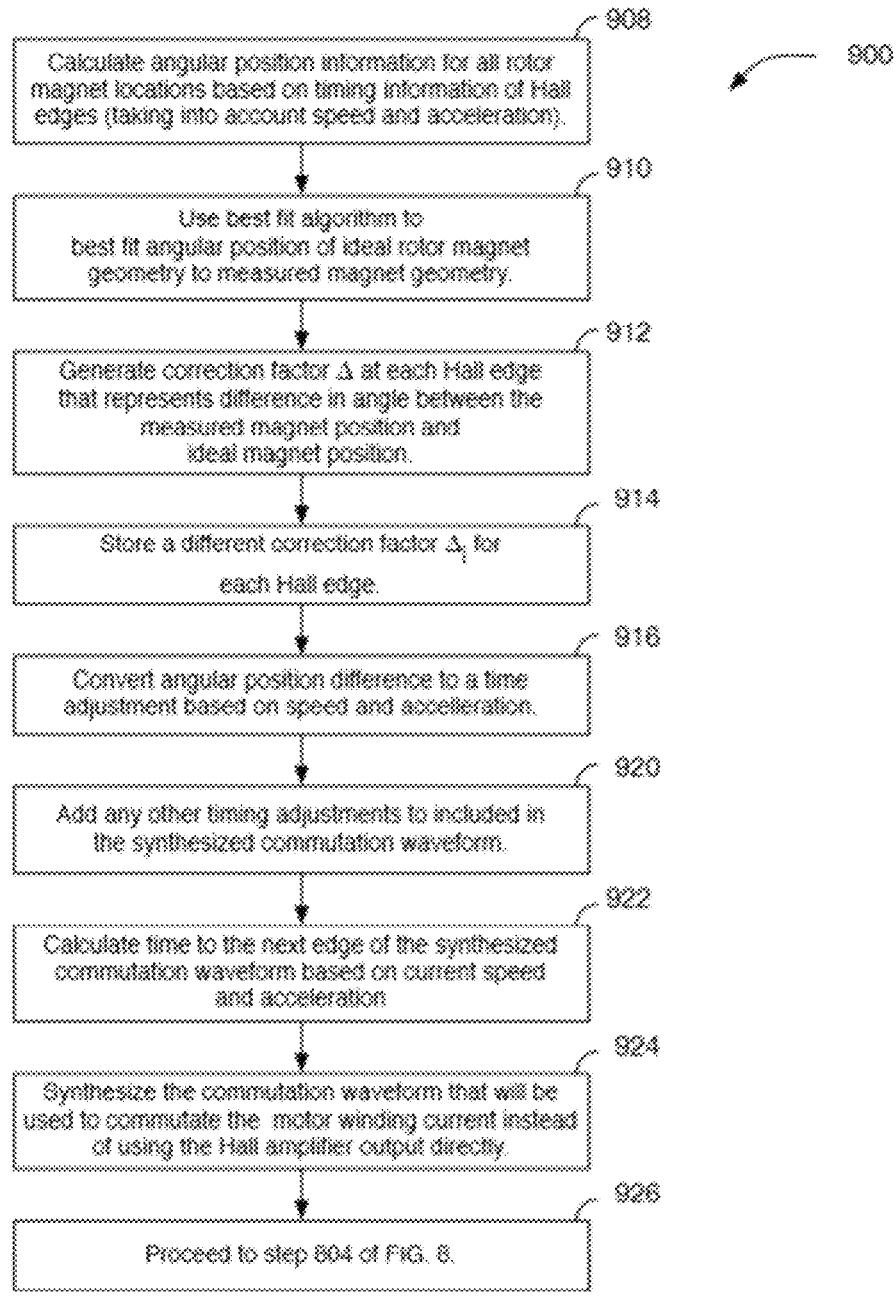
FIG. 15 shows another embodiment of a method for compensating for a variation in magnet size and/or position of the rotor.

FIG. 15 shows another flow chart for compensating for a variation in magnet size and/or magnet position of the rotor. The flowchart in FIG. 15 shares many similarities with the flow chart shown in FIG. 9. As such, redundant description is omitted for brevity. The method includes at 920, adding any other timing adjustments to be included in the synthesized commutation waveform.

Figure 16:
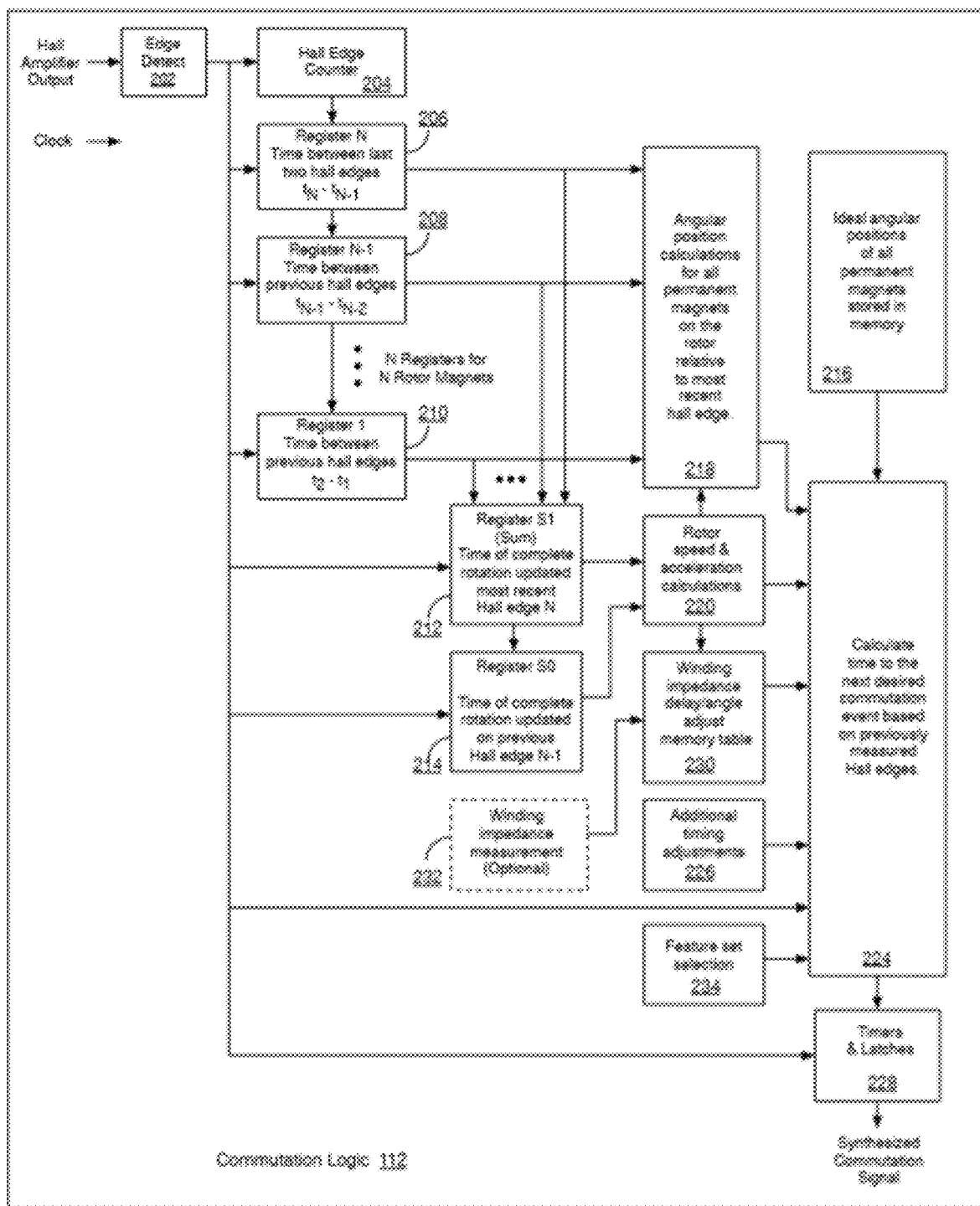
FIG. 16 shows another embodiment of the commutation logic block of FIG. 1.

FIG. 16 shows another embodiment of the commutation logic block 112. The communication logic block shown in FIG. 16 shares many similarities with the commutation logic block 112, shown in FIG. 2. As such, redundant description is omitted for brevity. The commutation block 112 shown in FIG. 16 accounts for winding impedance delay when generating the synthesized commutation signal. However, the commutation block does not take into account for magnetic asymmetry.

Figure 17:
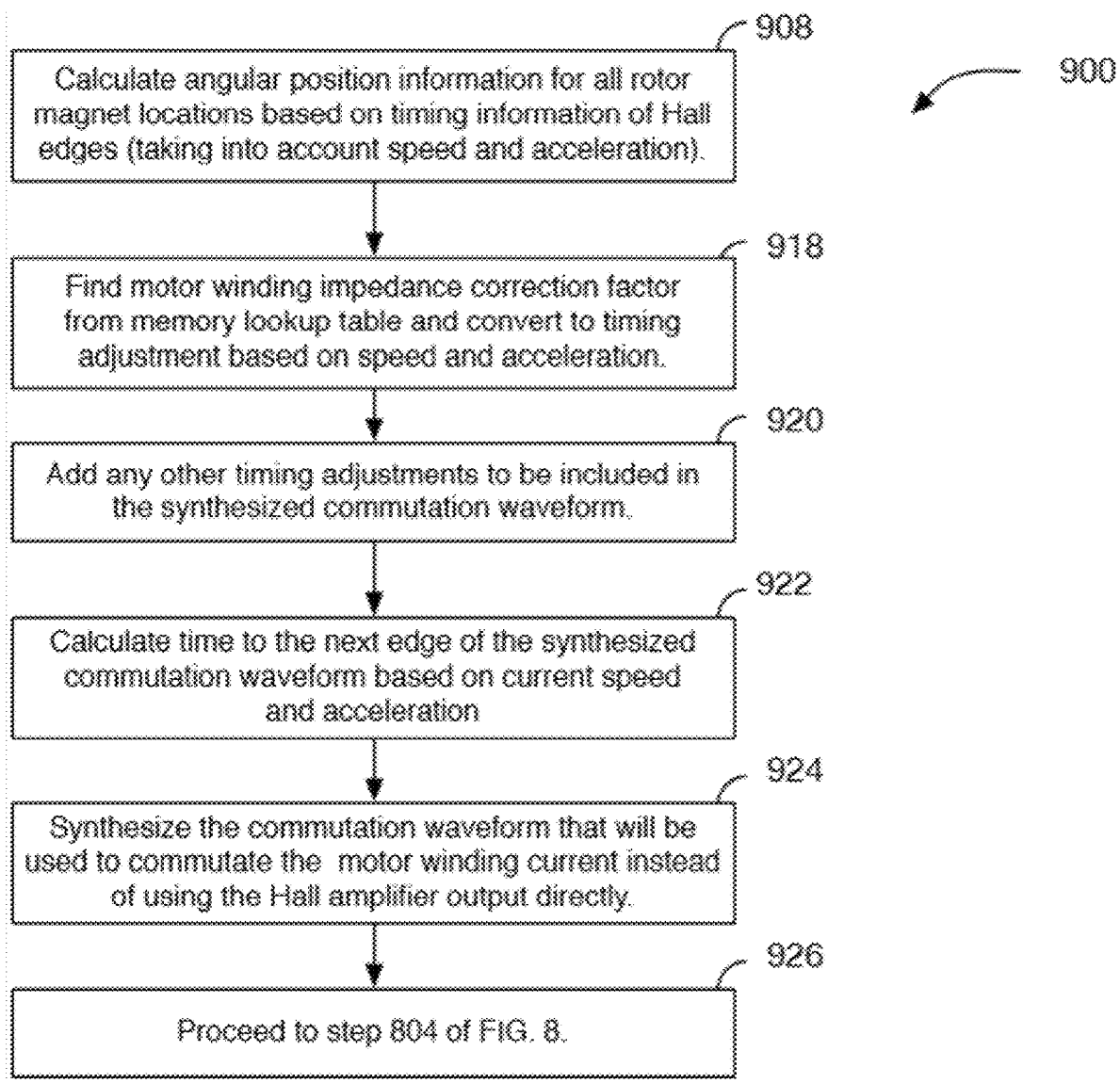
FIG. 17 shows another embodiment of a method for compensating for the winding impedance delay.

FIG. 17 shows another flow chart for compensating for the impedance of the motor windings. The flowchart in FIG. 17 shares many similarities with the flow chart shown in FIG. 9. As such, redundant description is omitted for brevity. The method includes at 920, adding any other timing adjustments to be included in the synthesized commutation waveform.

The invention will be further described in the following paragraphs. In one aspect, a method for compensating for a plurality of asymmetrical permanent rotor magnets disposed on a rotor with an integrated circuit coupled to a motor with a rotor having the plurality of asymmetrical permanent rotor magnets is provided. The method includes: at a motor controller, calculating a speed and acceleration of the rotor based on an output of a magnetic sensor indicating a polarity of a permanent magnet of the plurality of asymmetrical permanent rotor magnets that is closest to the magnetic sensor; calculating a non-ideal shape and angular position for each of the plurality of asymmetrical permanent rotor magnets based on timing information of the magnetic sensor output, the calculated speed of the rotor, and the calculated acceleration of the rotor; and generating a synthesized commutation signal for controlling commutation of current of a plurality of stator coils, the synthesized commutation signal correcting for the calculated non-ideal shape and non-ideal angular positions of the plurality of asymmetrical permanent rotor magnets on the rotor.

In another aspect, a system for generating a synthesized commutation signal that compensates for positions of a plurality of asymmetrical rotor magnets on a rotor is provided. The system includes a magnetic sensor amplifier configured to output an indication of magnetic polarity changes detected from a magnetic sensor during rotation of the rotor; one or more memory registers; one or more commutation and pulse width modulation switches; and commutation logic including instructions executable by a processor of the system to: calculate a speed and acceleration of the rotor based on an output of the magnetic sensor amplifier; calculate an angular position and shape for each of the plurality of asymmetrical rotor magnets on the rotor based on timing information for the detected magnetic polarity changes, the calculated speed of the rotor, and the calculated acceleration of the rotor; generate a synthesized commutation signal for controlling commutation of current of a plurality of stator coils, the synthesized commutation signal being based on the calculated angular position; and control, via the one or more commutation and pulse width modulation switches, a commutation of the current of the plurality of stator coils using the synthesized commutation signal.

In another aspect, a method for compensating for the motor winding impedance delay of a brushless DC motor with an integrated circuit coupled to the brushless DC motor is provided. The method includes at a motor controller, calculating the speed and acceleration of the rotor based on an output of a magnetic sensor indicating the polarity of a permanent magnet of the asymmetrical permanent rotor magnets that is closest to the magnetic sensor; storing and reading winding impedance delay information to and from a memory lookup table; calculating the time to when the next commutation event is to be initiated to correct for the winding impedance delay; and generating a synthesized commutation signal for controlling commutation of current of stator coils, the synthesized commutation signal correcting for the motor winding impedance delay.

In another aspect, a method for compensating for motor winding impedance delay of a brushless DC motor and creating a synthesized commutation waveform with an integrated circuit coupled to a motor with a permanent magnet rotor is provided. The method includes for each of a plurality of revolutions of the rotor: monitoring an output of a magnetic sensor to detect changes in polarity, for each detected polarity change, storing a respective time taken to reach the next polarity change from a prior detected polarity change or from a startup of the rotor, and calculating a respective speed of the rotor based on a revolution time for a respective revolution of the plurality of revolutions of the rotor; calculating an acceleration of the rotor based on the respective speeds calculated for each of the plurality of revolutions of the rotor; reading a winding impedance delay adjustment from a memory lookup table; generating a synthesized commutation waveform based on the winding impedance delay adjustment; selectively commutating the rotor current using the synthesized commutation waveform.

In another aspect, a system for generating a synthesized commutation signal that compensates for the motor winding impedance delay of a brushless DC motor is provided. The system includes a magnetic sensor amplifier configured to output a signal indicating magnetic polarity changes detected from a magnetic sensor during rotation of the rotor; one or more memory registers; one or more commutation and pulse width modulation switches; and commutation logic including instructions executable by a processor of the system to: calculate a speed and acceleration of the rotor based on an output of the magnetic sensor amplifier; store and read winding impedance delay information to and from a memory lookup table; generate a synthesized commutation signal for controlling commutation of current of a stator, the synthesized commutation signal being based on the winding impedance delay information; and control, via the one or more commutation and pulse width modulation switches, a commutation of the current of the stator using the synthesized commutation signal.

In yet another aspect, a system for generating a synthesized commutation signal that compensates for rotor magnet positions on a rotor is provided. The system comprises a magnetic sensor amplifier configured to output a signal indicating magnetic polarity changes detected from a magnetic sensor during rotation of the rotor; one or more memory registers; one or more commutation and pulse width modulation switches; and commutation logic including instructions executable by a processor of the system to: calculate a speed and acceleration of the rotor based on an output of the magnetic sensor amplifier; calculate an angular position and shape for each of a plurality of asymmetrical rotor magnets on the rotor based on timing information for the detected magnetic polarity changes, the calculated speed of the rotor, and the calculated acceleration of the rotor; generate a synthesized commutation signal for controlling commutation of current of a stator, the synthesized commutation signal being based on the calculated angular position; and control, via the one or more commutation and pulse width modulation switches, a commutation of the current of the stator using the synthesized commutation signal.

In any of the aspects or combinations of the aspects, the synthesized commutation signal may correct for a motor winding impedance delay.

In any of the aspects or combinations of the aspects, the method may further comprise prior to generating the synthesized commutation signal, storing and reading winding impedance delay information to and from memory in the motor controller; and calculating a period of time when the next commutation event is to be initiated to correct for the winding impedance delay.

In any of the aspects or combinations of the aspects, the method may further comprise comparing ideal relative angular positions between a plurality of asymmetrical permanent rotor magnets for an ideal rotor to calculated non-ideal relative angular positions between the plurality of asymmetrical permanent rotor magnets on the rotor of a motor being controlled to determine an angular difference, and converting the angular difference into timing information based on the calculated speed of the rotor and the calculated acceleration of the rotor.

In any of the aspects or combinations of the aspects, the method may further comprise performing an angular best fit of the ideal rotor magnet geometry to the calculated non-ideal rotor magnet geometry, then using a resulting best fit angular position to calculate a time to a next ideal change in a sensed polarity from the magnetic sensor or sensors, the calculated timing for the ideal change in the sensed polarity being used to commutate the current in the plurality of stator coils rather than using the output from the magnet sensor or sensors to commutate the coil current in the plurality of stator coils directly.

In any of the aspects or combinations of the aspects, the angular best fit may be performed using a recursive least squares or least mean squares approximation between detected changes in polarity from the magnetic sensor output and desired locations for the detected changes.

In any of the aspects or combinations of the aspects, a time to the next ideal detected change in magnetic polarity from the magnetic sensor output may be combined with additional timing information to generate the synthesized commutation signal.

In any of the aspects or combinations of the aspects, the method may further comprise controlling commutation of the current of the plurality of stator coils using information from the magnetic sensor directly under a first set of conditions and controlling commutation of the current of the rotor using the synthesized commutation signal under a second set of conditions.

In any of the aspects or combinations of the aspects, the second set of conditions may include conditions where the calculated speed of the rotor and the calculated acceleration of the rotor are within a range for the synthesized commutation signal to achieve a target level of accuracy.

In any of the aspects or combinations of the aspects, the first set of conditions may include conditions where the calculated speed of the rotor and the calculated acceleration of the rotor are not within a range for the synthesized commutation signal to achieve a target level of accuracy.

In any of the aspects or combinations of the aspects, the commutation logic may include instructions executable by the processor of the system to: prior to generating the synthesized commutation signal, store and reading winding impedance delay information to and from memory in the motor controller; and calculate a duration when the next commutation event is to be initiated to correct for the winding impedance delay; wherein the synthesized commutation signal corrects for the motor winding impedance delay.

In any of the aspects or combinations of the aspects, the commutation logic may include instructions executable by the processor of the system to: compare ideal relative angular positions between a plurality of asymmetrical permanent rotor magnets for an ideal rotor to calculated non-ideal relative angular positions between the plurality of asymmetrical permanent rotor magnets on the rotor of a motor being controlled to determine an angular difference, and converting the angular difference into timing information based on the calculated speed of the rotor and the calculated acceleration of the rotor; and perform an angular best fit of the ideal rotor magnet geometry to the calculated non-ideal rotor magnet geometry, then using a resulting best fit angular position to calculate a time to a next ideal change in a sensed polarity from the magnetic sensor or sensors, the calculated timing for the ideal change in the sensed polarity being used to commutate the current in the plurality of stator coils rather than using the output from the magnet sensor or sensors to commutate the current in the plurality of stator coils directly.

In any of the aspects or combinations of the aspects, a time to the next ideal detected change in magnetic polarity from the magnetic sensor output may be combined with additional timing information to generate the synthesized commutation signal.

In any of the aspects or combinations of the aspects, the commutation logic may include instructions executable by the processor of the system to: control commutation of the current of the plurality of stator coils using information from the magnetic sensor directly under a first set of conditions and controlling commutation of the current of the rotor using the synthesized commutation signal under a second set of conditions.

In any of the aspects or combinations of the aspects, the second set of conditions may include conditions where the calculated speed of the rotor and the calculated acceleration of the rotor are within a range for the synthesized commutation signal to achieve a target level of accuracy.

In any of the aspects or combinations of the aspects, the first set of conditions may include conditions where the calculated speed of the rotor and the calculated acceleration of the rotor are not within a range for the synthesized commutation signal to achieve a target level of accuracy.

In any of the aspects or combinations of the aspects, the rotor may be included in a single-phase motor winding configuration.

In any of the aspects or combinations of the aspects, the rotor may be included in a multiple phase motor winding configuration.

In any of the aspects or combinations of the aspects, the system may further include a brushless direct current (BLDC) motor in electronic communication with the one or more commutation and pulse width modulation switches.

In any of the aspects or combinations of the aspects, the method may further comprise calculating the shape and angular position for each of the permanent rotor magnets based on timing information of the magnetic sensor output, the calculated speed of the rotor, and the calculated acceleration of the rotor; comparing the relative angular positions between the permanent rotor magnets for an ideal rotor to the calculated relative angular position between permanent rotor magnets on the rotor of a motor being controlled to determine an angular difference, and converting the angular difference into timing information based on the calculated speed of the rotor and the calculated acceleration of the rotor.

In any of the aspects or combinations of the aspects, the method may further comprise performing an angular best fit of the ideal rotor magnet geometry to the calculated non-ideal rotor magnet geometry, then using a resulting best fit angular position to calculate the time to a next ideal change in the sensed polarity from the magnetic sensor or sensors, the calculated timing for the ideal change in sensed polarity being used together with the winding impedance delay information to commutate the current in the stator coils rather than using the output from the magnet sensor or sensors to commutate the stator coil current directly.

In any of the aspects or combinations of the aspects, the angular best fit may be performed using a recursive least squares or least mean squares approximation between the detected changes in polarity from the magnetic sensor output and the ideal locations for these changes.

In any of the aspects or combinations of the aspects, the time to the next ideal detected change in magnetic polarity from the magnetic sensor output may be combined with additional timing information to generate the synthesized commutation signal.

In any of the aspects or combinations of the aspects, the method may further comprise controlling commutation of the current of the stator using information from the magnetic sensor directly under first conditions and controlling commutation of the current of the rotor using the synthesized commutation signal under second conditions.

In any of the aspects or combinations of the aspects, the second conditions may include conditions where the calculated speed of the rotor and the calculated acceleration of the rotor are within range for the synthesized commutation signal to be accurate.

In any of the aspects or combinations of the aspects, the first conditions may include conditions where the calculated speed of the rotor and the calculated acceleration of the rotor are not within range for the synthesized commutation signal to be accurate.

In any of the aspects or combinations of the aspects, the method may further include compensating for non-ideal asymmetrical rotor magnets, the method further comprising: for each of a plurality of revolutions of the rotor: calculating angular position information for locations of the asymmetrical rotor magnets based on the respective time taken to reach the respective detected polarity change, the respective speeds calculated for the rotor, and the acceleration calculated for the rotor; generating and storing an angle correction factor at each detected polarity change that represents a difference in angle between the angular position information for a respective location of each asymmetrical rotor magnet and a respective ideal location for each asymmetrical rotor magnet; converting the angle correction factor into an adjusted angle time difference to a next ideal polarity change; generating a synthesized commutation waveform based on the winding impedance delay adjustment and the adjusted angle time difference; and selectively commutating the rotor current using the synthesized commutation waveform.

In any of the aspects or combinations of the aspects, the system may further include commutation logic including instructions executable by the processor of the system to: compensate for non-ideal asymmetrical rotor magnets and additions to the commutation logic including instructions executable by the processor of the system to: calculate an angular position and shape for each of a plurality of asymmetrical rotor magnets on the rotor based on timing information for the detected magnetic polarity changes, the calculated speed of the rotor, and the calculated acceleration of the rotor; calculate and store an angle correction factor at each detected polarity change that represents a difference in angle between the angular position information for a respective location of each asymmetrical rotor magnet and a respective ideal location for each asymmetrical rotor magnet; calculate an angular best for the plurality of asymmetrical rotor magnets to the ideal rotor magnet shapes and positions; convert the angular best fit to a timing adjustment based on speed and acceleration; generate a synthesized commutation signal for controlling commutation of current of a stator, the synthesized commutation signal being based on the winding impedance delay information and the angular best fit timing information.

In any of the aspects or combinations of the aspects, the system may comprise a motor control integrated circuit.

In any of the aspects or combinations of the aspects, the system may further comprise the rotor having the plurality of asymmetrical rotor magnets disposed thereon.

In any of the aspects or combinations of the aspects, the rotor may be included in a single-phase motor winding configuration.

In any of the aspects or combinations of the aspects, the rotor may be included in a multiple phase motor winding configuration.

In any of the aspects or combinations of the aspects, the system may comprise a motor control integrated circuit.

In any of the aspects or combinations of the aspects, the system may comprise a motor control integrated circuit.

In any of the aspects or combinations of the aspects, the system may further comprise the rotor having the plurality of asymmetrical rotor magnets disposed thereon.

In any of the aspects or combinations of the aspects, the system may further comprise the rotor having the plurality of asymmetrical rotor Note that the example control and estimation routines included herein can be used with various system configurations. The control methods and routines disclosed herein may be stored as executable instructions in non-transitory memory and may be carried out by a tooling apparatus. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the system, where the described actions are carried out by executing the instructions in a system including the various components.

It will be appreciated that the configurations and routines disclosed herein are exemplary in nature, and that these specific embodiments are not to be considered in a limiting sense, because numerous variations are possible. For example, the above technology can be applied to a broad range of manufacturing fields such as the aerospace industry, the construction industry, the maritime industry, etc. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for compensating for a plurality of non-ideal asymmetrically shaped permanent rotor magnets and their non-ideal placement on a rotor of a brushless DC motor with an integrated circuit coupled to the motor, the method comprising:
    at a motor controller, calculating a position, speed, and acceleration of the rotor based on an output of a magnetic sensor indicating a polarity of the magnetic field from the plurality of asymmetrical permanent rotor magnets at the magnetic sensor;
    calculating a non-ideal shape and angular position for each of the plurality of asymmetrical permanent rotor magnets based on timing information of the magnetic sensor output, the calculated speed of the rotor, and the calculated acceleration of the rotor; and
    generating a synthesized commutation signal for controlling commutation of current of a plurality of stator coils, the synthesized commutation signal correcting for the calculated non-ideal shape and non-ideal angular positions of the plurality of asymmetrical permanent rotor magnets on the rotor,
    wherein calculating the non-ideal shape and angular position for each of the plurality of asymmetrical permanent rotor magnets includes determining a time difference for each rotor magnet relative to an ideal magnet, the method further comprising determining a winding impedance timing adjustment, wherein the synthesized commutation signal is based on the time difference for each rotor magnet relative to the ideal magnet and the winding impedance timing adjustment, and wherein the synthesized commutation signal corrects for a motor winding impedance delay.

2. The method of claim 1, further comprising:
    prior to generating the synthesized commutation signal, storing and reading winding impedance delay information to and from memory in the motor controller; and
    calculating a period of time when the next commutation event is to be initiated to correct for the winding impedance delay.

3. The method of claim 1, further comprising:
    comparing ideal relative angular positions between a plurality of asymmetrical permanent rotor magnets for an ideal rotor to calculated non-ideal relative angular positions between the plurality of asymmetrical permanent rotor magnets on the rotor of a motor being controlled to determine an angular difference, and converting the angular difference into timing information based on the calculated speed of the rotor and the calculated acceleration of the rotor.

4. The method of claim 3, further comprising:
    performing an angular best fit of the ideal rotor magnet geometry to the calculated non-ideal rotor magnet geometry, then using a resulting best fit angular position to calculate a time to a next ideal change in a sensed polarity from the magnetic sensor or sensors, the calculated timing for the ideal change in the sensed polarity being used to commutate the current in the plurality of stator coils rather than using the output from the magnet sensor or sensors to commutate the coil current in the plurality of stator coils directly.

5. The method of claim 4, wherein the angular best fit is performed using a recursive least squares or least mean squares approximation between detected changes in polarity from the magnetic sensor output and desired locations for the detected changes.

6. The method of claim 4, wherein a time to the next ideal detected change in magnetic polarity from the magnetic sensor output is combined with additional timing information to generate the synthesized commutation signal.

7. The method of claim 1, further comprising:
controlling commutation of the current of the plurality of stator coils using information from the magnetic sensor directly under a first set of conditions and controlling commutation of the current of the rotor using the synthesized commutation signal under a second set of conditions.

8. The method of claim 7, wherein the second set of conditions include conditions where the calculated speed of the rotor and the calculated acceleration of the rotor are within a range for the synthesized commutation signal to achieve a target level of accuracy.

9. The method of claim 7, wherein the first set of conditions include conditions where the calculated speed of the rotor and the calculated acceleration of the rotor are not within a range for the synthesized commutation signal to achieve a target level of accuracy.

10. The method of claim 1, wherein the rotor is included in a single-phase motor winding configuration.

11. A system for generating a synthesized commutation signal that compensates for positions of a plurality of asymmetrical rotor magnets on a rotor, the system comprising:
a magnetic sensor amplifier configured to output an indication of magnetic polarity changes detected from a magnetic sensor during rotation of the rotor;
one or more memory registers;
one or more commutation and pulse width modulation switches; and
commutation logic including instructions executable by a processor of the system to:
calculate a speed and acceleration of the rotor based on an output of the magnetic sensor amplifier;
calculate an angular position and shape for each of the plurality of asymmetrical rotor magnets on the rotor based on timing information for the detected magnetic polarity changes, the calculated speed of the rotor, and the calculated acceleration of the rotor;
generate a synthesized commutation signal for controlling commutation of current of a plurality of stator coils, the synthesized commutation signal being based on the calculated angular position; and
control, via the one or more commutation and pulse width modulation switches, a commutation of the current of the plurality of stator coils using the synthesized commutation signal, wherein the commutation logic includes instructions executable by the processor of the system to:
compare ideal relative angular positions between a plurality of asymmetrical permanent rotor magnets for an ideal rotor to calculated non-ideal relative angular positions between the plurality of asymmetrical permanent rotor magnets on the rotor of a motor being controlled to determine an angular difference, and converting the angular difference into timing information based on the calculated speed of the rotor and the calculated acceleration of the rotor; and
perform an angular best fit of the ideal rotor magnet geometry to the calculated non-ideal rotor magnet geometry, then using a resulting best fit angular position to calculate a time to a next ideal change in a sensed polarity from the magnetic sensor or sensors, the calculated timing for the ideal change in the sensed polarity being used to commutate the current in the plurality of stator coils rather than using the output from the magnet sensor or sensors to commutate the current in the plurality of stator coils directly.

12. The system of claim 11, wherein the commutation logic includes instructions executable by the processor of the system to:
prior to generating the synthesized commutation signal, store and reading winding impedance delay information to and from memory in the motor controller; and
calculate a duration when the next commutation event is to be initiated to correct for the winding impedance delay;
wherein the synthesized commutation signal corrects for the motor winding impedance delay.

13. The system of claim 11, wherein a time to the next ideal detected change in magnetic polarity from the magnetic sensor output is combined with additional timing information to generate the synthesized commutation signal.

14. The system of claim 11, wherein the commutation logic includes instructions executable by the processor of the system to:
control commutation of the current of the plurality of stator coils using information from the magnetic sensor directly under a first set of conditions and controlling commutation of the current of the rotor using the synthesized commutation signal under a second set of conditions.

15. The system of claim 14, wherein the second set of conditions include conditions where the calculated speed of the rotor and the calculated acceleration of the rotor are within a range for the synthesized commutation signal to achieve a target level of accuracy.

16. The system of claim 14, wherein the first set of conditions include conditions where the calculated speed of the rotor and the calculated acceleration of the rotor are not within a range for the synthesized commutation signal to achieve a target level of accuracy.

17. The system of claim 11, wherein the rotor is included in a single-phase motor winding configuration.

18. The system of claim 11, wherein the rotor is included in a multiple phase motor winding configuration.

19. The system of claim 11, further comprising a brushless direct current (BLDC) motor in electronic communication with the one or more commutation and pulse width modulation switches.

* * * * *